(12) United States Patent
Yamazaki et al.

(10) Patent No.: US 7,518,692 B2
(45) Date of Patent: Apr. 14, 2009

(54) IC CARD AND BOOKING ACCOUNT SYSTEM USING THE IC CARD

(75) Inventors: Shunpei Yamazaki, Setagaya (JP); Toru Takayama, Atsugi (JP); Junya Maruyama, Ebina (JP); Yuugo Goto, Atsugi (JP); Yumiko Ohno, Atsugi (JP); Mai Akiba, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 271 days.

(21) Appl. No.: 10/739,084

(22) Filed: Dec. 19, 2003

(65) Prior Publication Data

US 2004/0129450 A1 Jul. 8, 2004

(30) Foreign Application Priority Data

Dec. 27, 2002 (JP) ............................. 2002-378853

(51) Int. Cl.
G02F 1/1339 (2006.01)
G02F 1/1345 (2006.01)
(52) U.S. Cl. ...................................... 349/153; 349/151
(58) Field of Classification Search ................. 349/151, 349/153
See application file for complete search history.

(56) References Cited

U.S. PATENT DOCUMENTS

| | | | |
|---|---|---|---|
| 4,238,848 A | | 12/1980 | Yamaguchi et al. |
| 4,472,627 A | * | 9/1984 | Weinberger ................. 235/487 |
| 4,536,014 A | * | 8/1985 | Boutaleb et al. ............... 283/83 |
| 4,614,861 A | | 9/1986 | Pavlov et al. |
| 4,667,087 A | | 5/1987 | Quintana |
| 4,709,991 A | * | 12/1987 | Hoshikawa ................. 349/122 |
| 4,709,995 A | * | 12/1987 | Kuribayashi et al. .......... 345/89 |
| 4,754,418 A | | 6/1988 | Hara |
| 4,876,441 A | | 10/1989 | Hara et al. |

(Continued)

FOREIGN PATENT DOCUMENTS

CN 1302418 7/2001

(Continued)

OTHER PUBLICATIONS

European Search Report dated Jun. 29, 2004 for Application No. 03029235.3.

(Continued)

*Primary Examiner*—James A Dudek
(74) *Attorney, Agent, or Firm*—Eric J. Robinson; Robinson Intellectual Property Law Office, P.C.

(57) ABSTRACT

It is an object of the present invention to provide a highly sophisticated functional card that can ensure security by preventing forgery such as changing a picture of a face, and display other images as well as the picture of a face. A card comprising a display device and a thin film integrated circuit; wherein driving of the display device is controlled by the thin film integrated circuit; a semiconductor element used for the thin film integrated circuit and the display device is formed by using a polycrystalline semiconductor film; the thin film integrated circuit and the display device are sealed with a resin between a first substrate and a second substrate of the card; and the first substrate and the second substrate are plastic substrates.

64 Claims, 36 Drawing Sheets

U.S. PATENT DOCUMENTS

| | | | |
|---|---|---|---|
| 4,918,631 A | 4/1990 | Hara et al. | |
| 4,931,623 A | 6/1990 | Nakamura et al. | |
| 4,954,985 A | 9/1990 | Yamazaki | |
| 5,148,301 A * | 9/1992 | Sawatsubashi et al. | 349/153 |
| 5,412,192 A * | 5/1995 | Hoss | 235/380 |
| 5,436,744 A | 7/1995 | Arledge et al. | |
| 5,567,967 A | 10/1996 | Kusumoto | |
| 5,643,826 A | 7/1997 | Ohtani et al. | |
| 5,656,511 A | 8/1997 | Shindo | |
| 5,693,956 A | 12/1997 | Shi et al. | |
| 5,703,755 A | 12/1997 | Flesher et al. | |
| 5,705,829 A | 1/1998 | Miyanaga et al. | |
| 5,737,272 A | 4/1998 | Uchiyama et al. | |
| 5,789,732 A | 8/1998 | McMahon et al. | |
| 5,834,071 A | 11/1998 | Lin | |
| 5,923,962 A | 7/1999 | Ohtani et al. | |
| 6,012,636 A | 1/2000 | Smith | |
| 6,019,284 A | 2/2000 | Freeman et al. | |
| 6,028,926 A | 2/2000 | Henderson et al. | |
| 6,064,988 A | 5/2000 | Thomas | |
| 6,191,838 B1 | 2/2001 | Muramatsu | |
| 6,300,152 B1 * | 10/2001 | Kim | 438/30 |
| 6,360,954 B1 | 3/2002 | Barnardo | |
| 6,391,747 B1 | 5/2002 | Okumura et al. | |
| 6,402,039 B1 | 6/2002 | Freeman et al. | |
| 6,414,441 B1 | 7/2002 | Fries et al. | |
| 6,456,353 B1 | 9/2002 | Chen | |
| 6,518,557 B1 | 2/2003 | Izumi et al. | |
| 6,616,035 B2 | 9/2003 | Ehrensvard et al. | |
| 6,859,195 B2 * | 2/2005 | Kodate | 345/92 |
| 6,961,111 B1 | 11/2005 | Kuramasu | |
| 7,105,365 B2 | 9/2006 | Hiroki et al. | |
| 7,112,115 B1 | 9/2006 | Yamazaki et al. | |
| 7,158,031 B2 * | 1/2007 | Tuttle | 340/572.1 |
| 7,239,564 B2 | 7/2007 | Mutaguchi | |
| 2001/0000763 A1 | 5/2001 | Muramatsu | |
| 2001/0009342 A1 | 7/2001 | Furukawa et al. | |
| 2001/0022644 A1 * | 9/2001 | Hinata | 349/149 |
| 2002/0159010 A1 | 10/2002 | Maeda et al. | |
| 2002/0186341 A1 | 12/2002 | Yamamura et al. | |
| 2003/0012870 A1 | 1/2003 | Sakurada | |
| 2003/0067576 A1 | 4/2003 | Cho | |
| 2003/0089132 A1 | 5/2003 | Kusuda | |
| 2003/0090450 A1 | 5/2003 | Inada et al. | |
| 2004/0004434 A1 | 1/2004 | Nishi et al. | |
| 2004/0090829 A1 | 5/2004 | Miura et al. | |
| 2004/0108987 A1 | 6/2004 | Park et al. | |
| 2004/0128246 A1 | 7/2004 | Takayama et al. | |
| 2005/0045729 A1 | 3/2005 | Yamazaki | |
| 2005/0106841 A1 | 5/2005 | I-Chang | |
| 2005/0139918 A1 | 6/2005 | Lee | |
| 2006/0097286 A1 | 5/2006 | Chung et al. | |

FOREIGN PATENT DOCUMENTS

| | | |
|---|---|---|
| EP | 0 073 603 | 3/1983 |
| EP | 0 291 259 | 11/1988 |
| JP | 56-014369 | 2/1981 |
| JP | 02-007105 | 2/1990 |
| JP | 07-130652 | 5/1995 |
| JP | 09-051020 | 2/1997 |
| JP | 09-51020 | 2/1997 |
| WO | WO 01/09954 | 2/2001 |
| WO | WO 2002/0069251 | 9/2002 |
| WO | WO 03/030096 | 4/2003 |

OTHER PUBLICATIONS

Zhu J. et al., "Producing technology of Polysilicon Micro Machine Film" J. Sensor & Transducer Techno., 1993, No. 6, pp. 38-39/55.

Office Action (Application No. 200310123568.4; CN6857) Dated Nov. 24, 2006.

Office Action (Application No. 200310123568.4) dated May 25, 2007.

Office Action (Application No. 200310123564.6) Dated May 25, 2007.

* cited by examiner

Fig. 5A
Fig. 5B
Fig. 5C
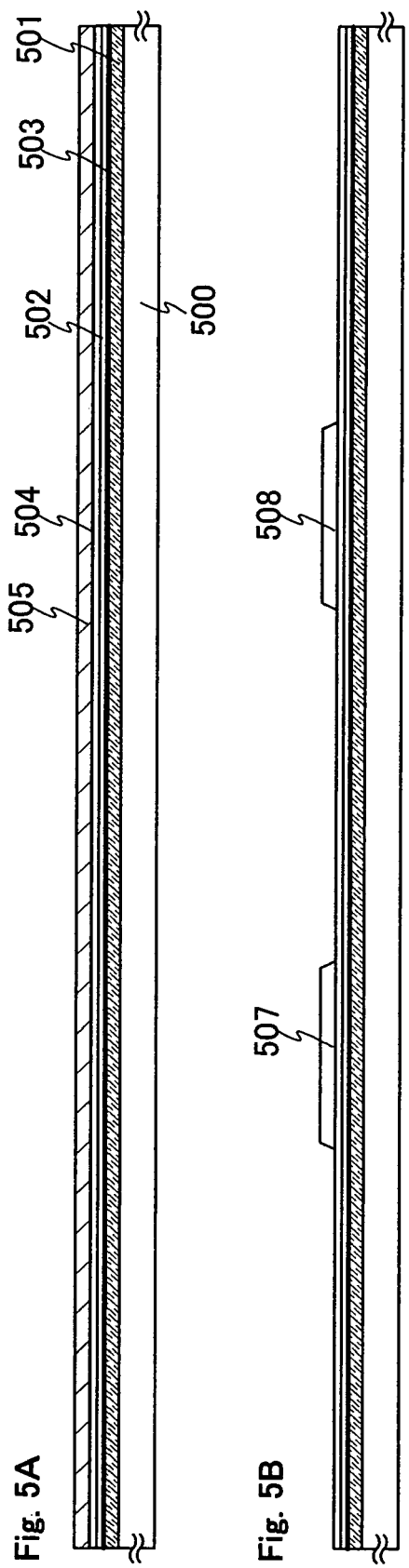
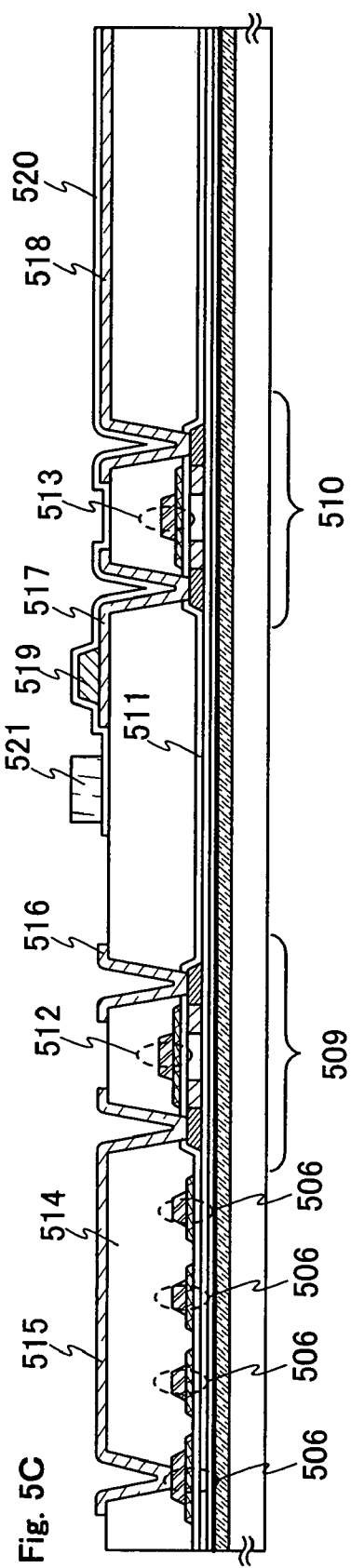

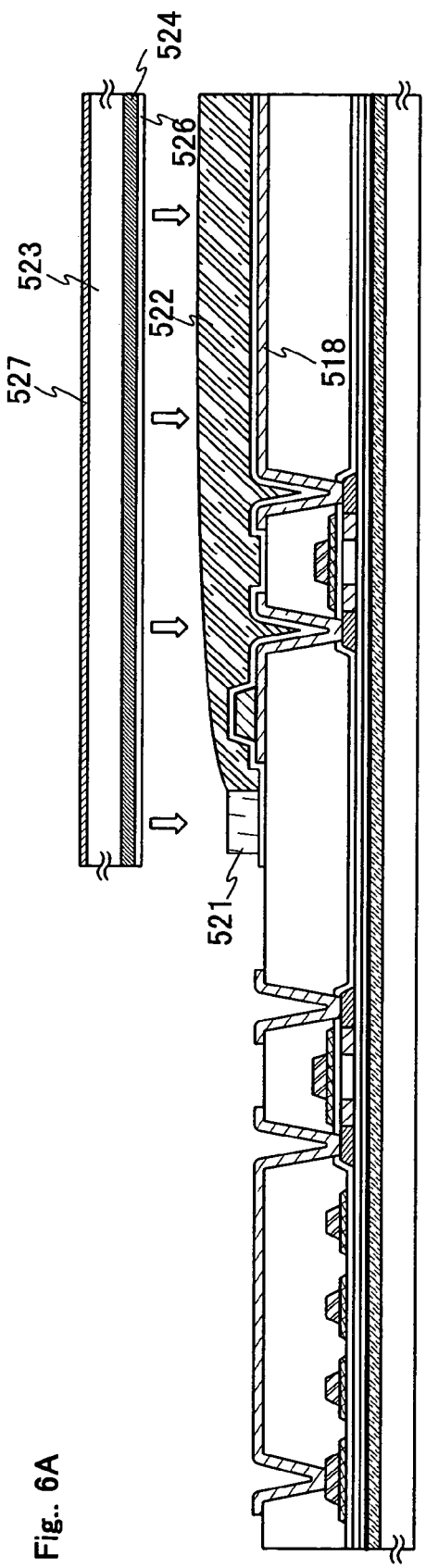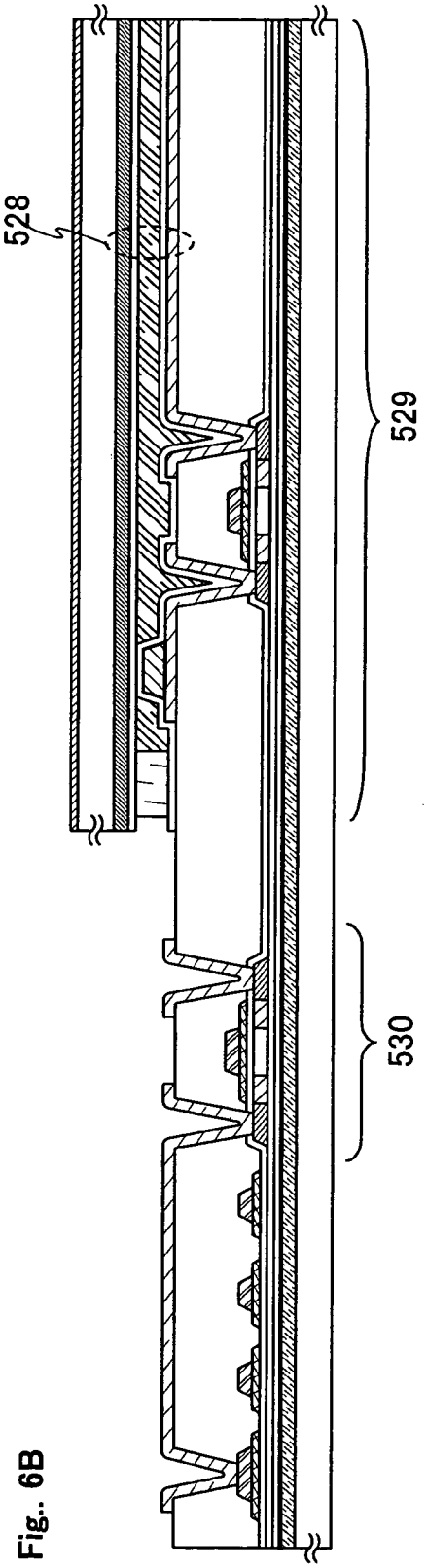
Fig. 6A
Fig. 6B

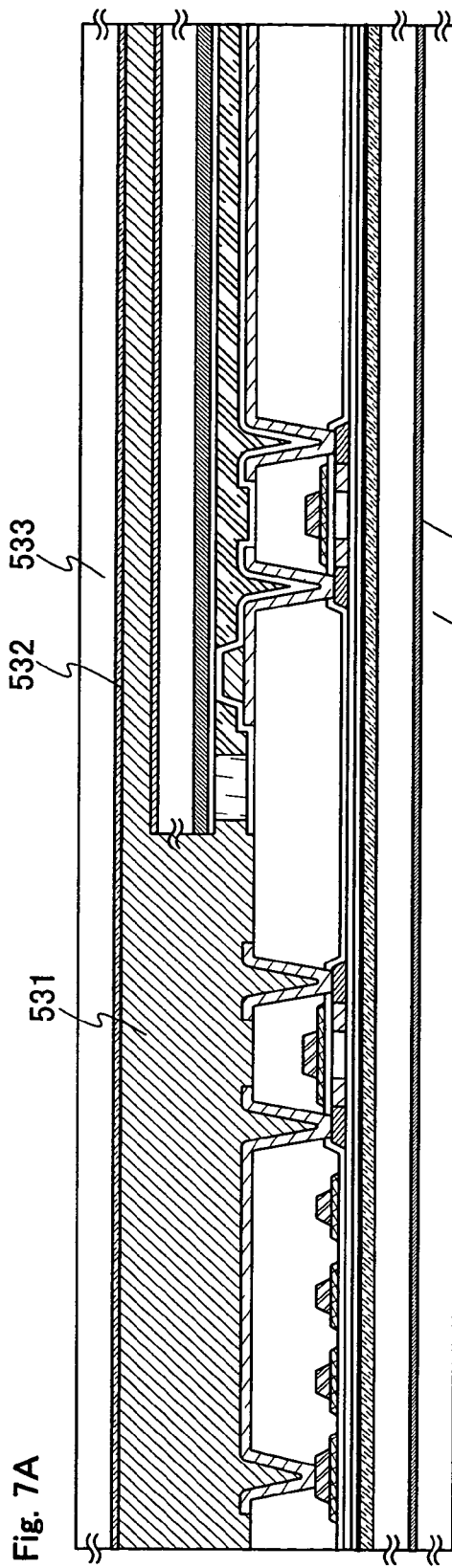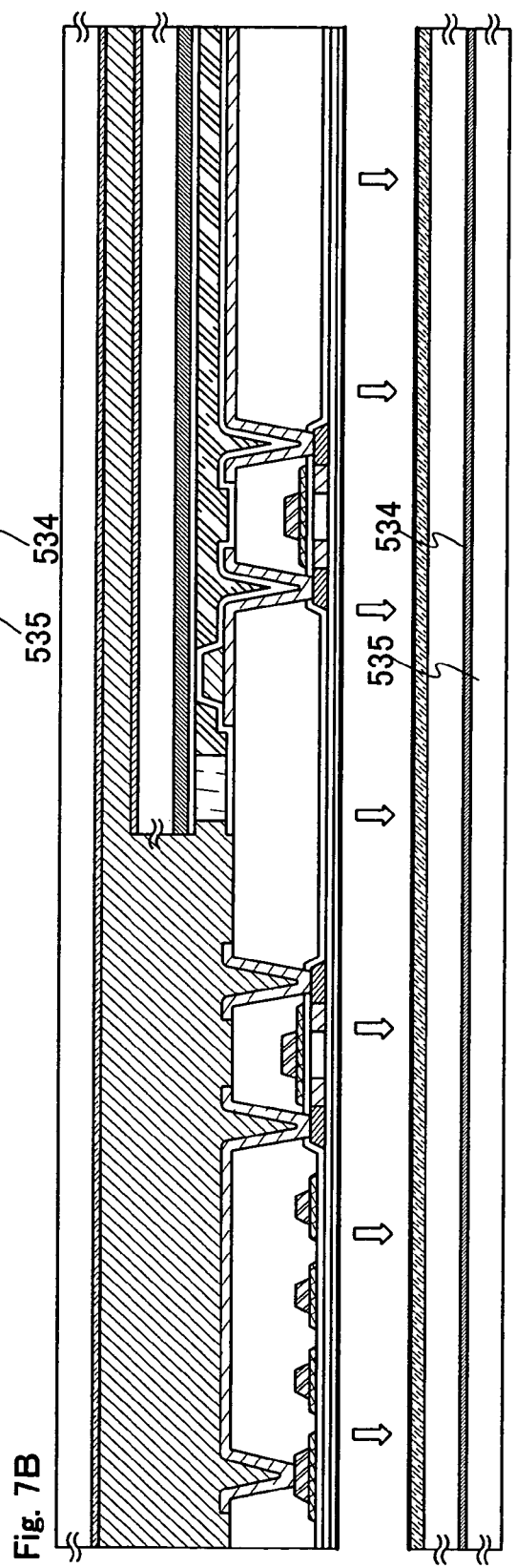
Fig. 7A
Fig. 7B

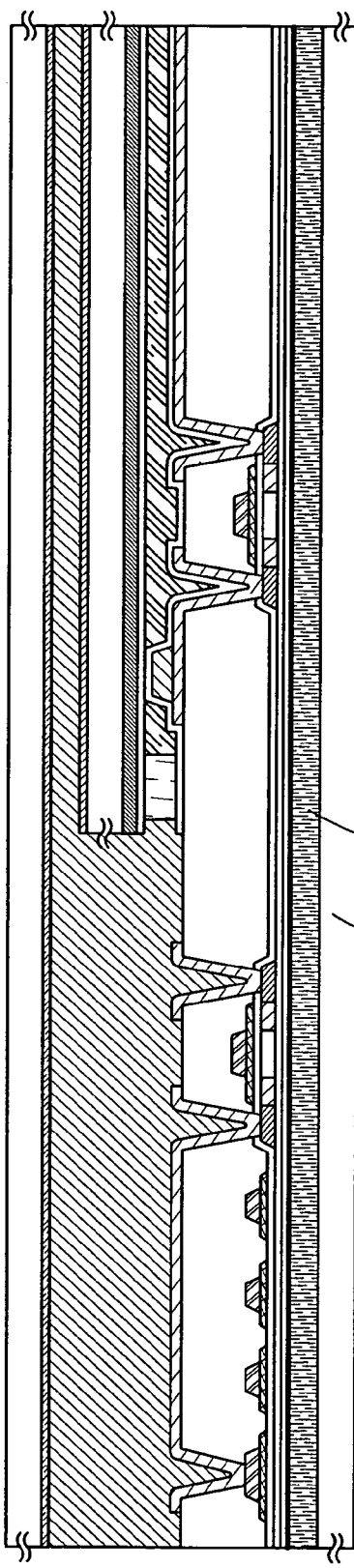
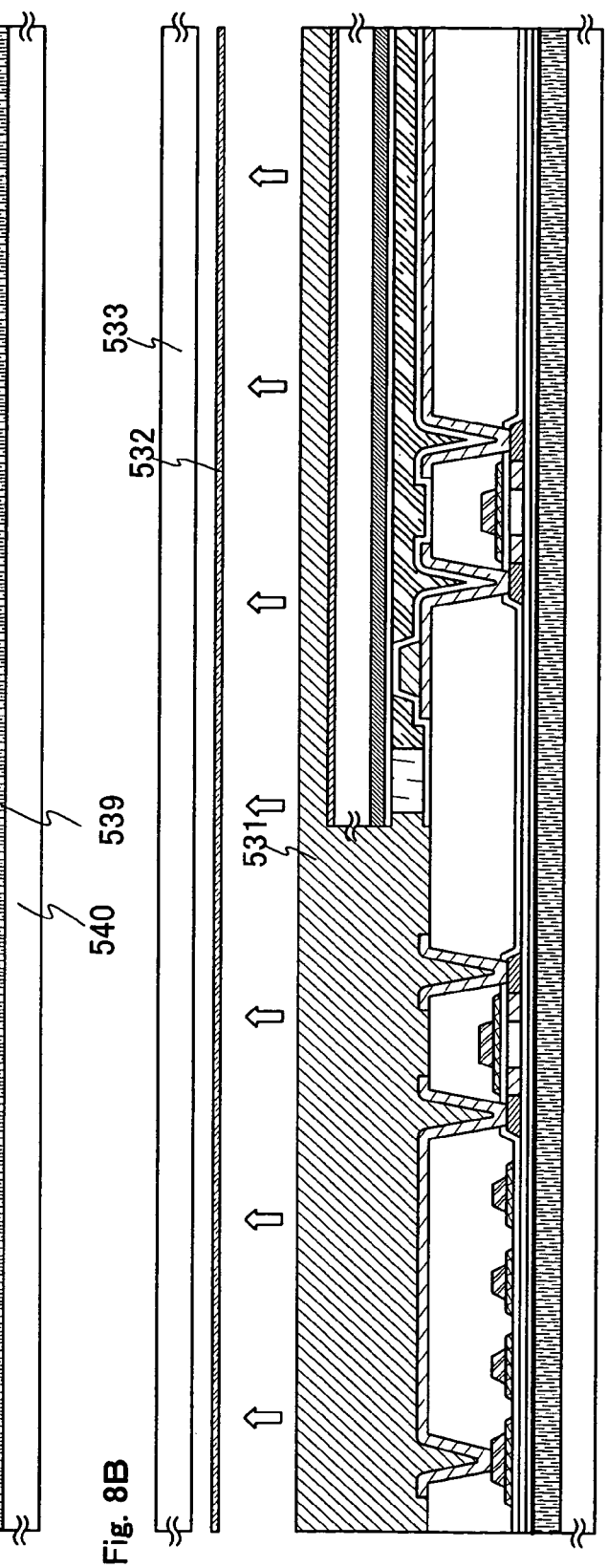
Fig. 8A
Fig. 8B

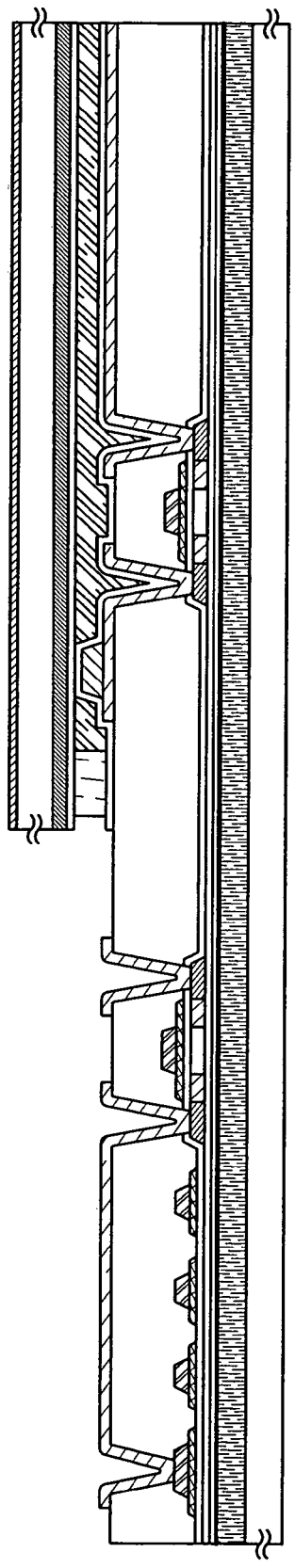
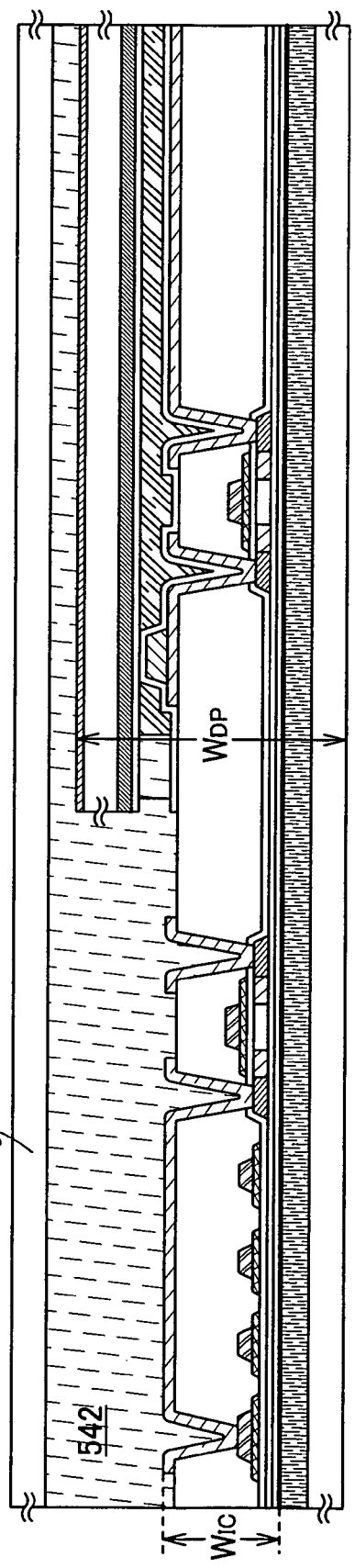
Fig. 9A
Fig. 9B

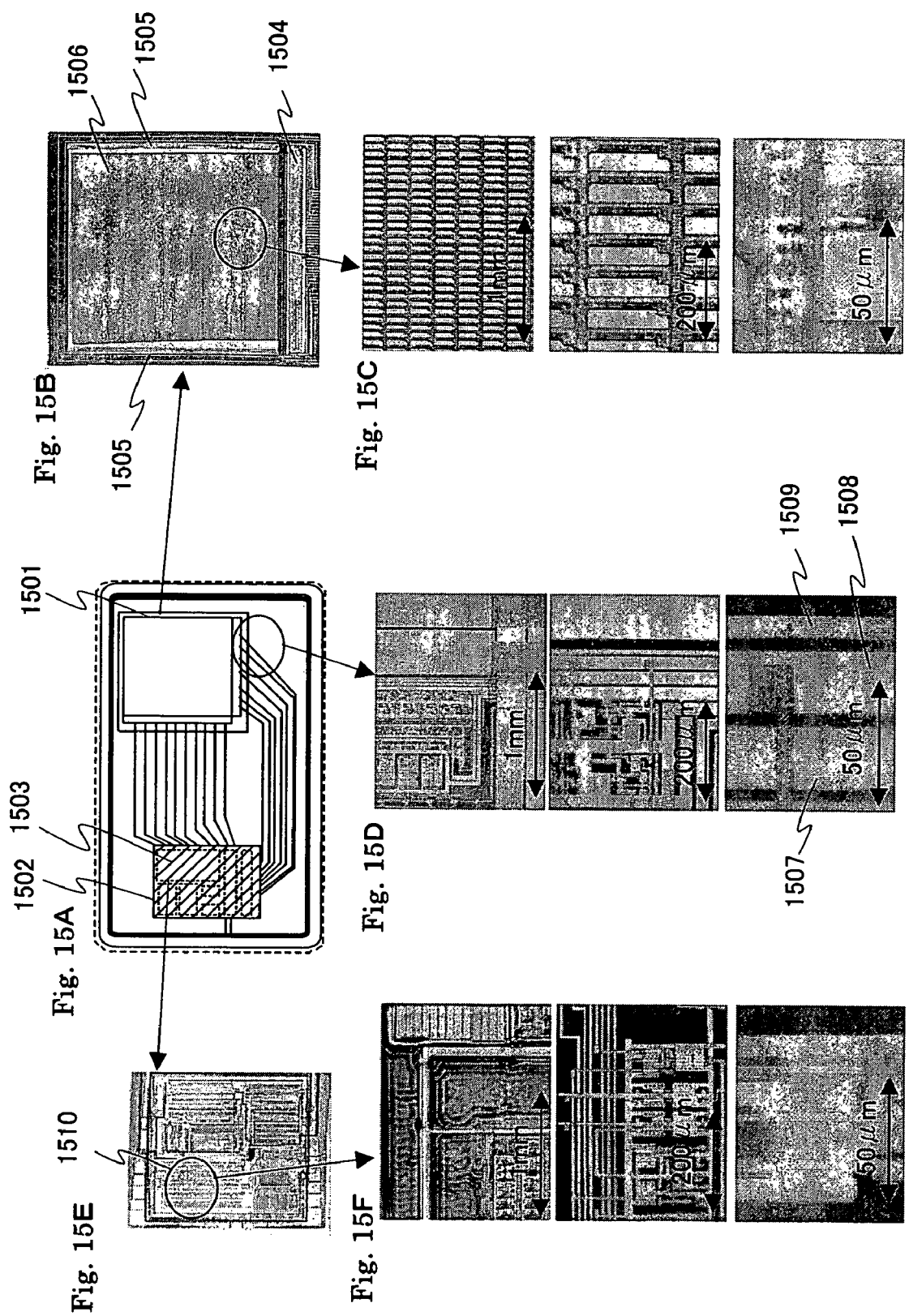

IC CARD AND BOOKING ACCOUNT SYSTEM USING THE IC CARD

BACKGROUND OF THE INVENTION

1. Field of the Invention

The present invention relates to a card typified by an electronic card incorporating an integrated circuit such as a memory or a micro processor (CPU). Further, the present invention relates to a booking-account system of a dealing content in the case of using the card as an ATM card (automated teller machine, which is also called a cash card).

2. Description of the Related Art

Only several ten bytes of data can be memorized in a magnetic card that can memorize data magnetically. However, an electronic card (IC card) incorporating a semiconductor memory, normally, can memorize about 5 KB of data or more. The IC card can memorize much more data than a magnetic card. Further, the IC card has merits as follows: the IC card does not have a risk that data is read out by a physical way such as putting iron sand on a card, different from a magnetic card, and that data memorized in the IC card is not easily falsified.

It is noted that a category of a card typified by an electronic card includes an ID card used as a substitute for an identification paper, a semi hard card having flexibility such as a plastic card, and the like.

In recent years, an IC card has been further sophisticated by being provided with a CPU as well as a memory. The application thereof is wide-ranging, for example, an IC card is applied to an ATM card, a credit cart, a prepaid card, a patient's registration card, an identity card such as a student card or an employee ID card, a train pass, a membership card, etc. As an example of the advanced function, an IC card for which a display device that can display simple characters and numbers is provided and with which a keyboard to input numbers is provided is described in the reference 1 (Reference 1. Japanese Published Examined Application No. H02-7105).

As described in Refernce. 1, a new use becomes possible by adding a new function to an ID card. Nowadays, electronic commerce, teleworking, remote medical care, remote education, computerized administrative services, electronic toll collection (ETC) of an expressway, image distribution service, and the like using an IC card are to be put to a practical use and it is considered that an IC card will be used in a wider field in the future.

As an IC card is used more widely, an unauthorized use of an IC card is becoming an unignorable problem. A future issue is an improvement of security of personal identification on a use of an IC card.

Printing a picture of a face in an IC card is one of measures for preventing an unauthorized use of an IC card. It is possible, by printing a picture of a face, that a third person can identify a person to be identified at a glance without saying anything when the person uses his/her IC card, if such identification is not performed in an unattended terminal equipment such as ATM. An unauthorized use can be prevented efficiently in the case where a security camera that can take a picture of a user's face at close range is not provided.

However, in general, a picture of a face is transferred to an IC card by a printing method, and thus, there is a pitfall that the picture of a face is easily changed by forgery.

The thickness of an IC card is thin, generally 0.7 mm. Thus, it is necessary to provide a larger number of integrated circuits having a larger memory capacity or a larger circuit scale within the limited area for sake of highly sophisticated functionality when the area on which the integrated circuit is mounted is limited.

SUMMARY OF THE INVENTION

It is an object of the present invention to provide a highly advanced functional IC card that can ensure security by preventing forgery such as changing a picture of a face, and that can display other images as well as a picture of a face.

According to the present invention, a display device, in addition to an integrated circuit, which is thin enough to be accommodated within an IC card is equipped with the IC card. Specifically, an integrated circuit and a display device are manufactured by a method described hereinafter.

A metal film is formed over a first substrate and a surface of the metal film is oxidized to form an ultrathin metal oxide film of several nm in thickness. An insulating film and a semiconductor film are laminated over the metal oxide film sequentially. A semiconductor element to be used for an integrated circuit or a display device is manufactured by using the semiconductor film. In this specification, the integrated circuit used in the present invention is referred to as a thin film integrated circuit hereinafter, for the purpose of distinguishing the integrated circuit from an integrated circuit formed by using an existing silicon wafer.

In the present invention, the metal oxide film is crystallized by a heat treatment performed in a process for forming the semiconductor element. Brittleness of the metal oxide film is enhanced by the crystallization, and thus the substrate can be peeled off easily from the semiconductor element. It is not always required for the heat treatment performed in a process for forming the semiconductor element to serves as a process for crystallizing the metal oxide film. However, when a card substrate or a covering material to be bonded later, or a counter substrate used for a liquid crystal display device has a poor heat resistance, the heat treatment is preferably performed before they are bonded.

The semiconductor element is formed, and then, before manufacturing a display element used for the display device, a second substrate is bonded so as to cover the semiconductor element, thereby forming a state in which the semiconductor element is sandwiched between the first substrate and the second substrate.

A third substrate is bonded to the side of the first substrate opposite to the side on which the semiconductor element is formed in order to enhance rigidity of the first substrate. When the rigidity of the first substrate is higher than that of the second substrate, the first substrate can be peeled off smoothly with fewer damages to the semiconductor element. However, the third substrate is not always required to be bonded to the first substrate as long as the rigidity of the first substrate is enough high when the first substrate is peeled off from the semiconductor element in a later process.

The first substrate and the third substrate are together peeled off from the semiconductor element. Three cases of separated portions can be considered to occur from the peeling, that is, the portion in which the metal film is separated from the metal oxide film, the portion in which the insulating film is separated from the metal oxide film, or the portion in which the metal oxide film is separated to two sides itself. In any case, the semiconductor element is peeled off from the first substrate so that the semiconductor element can keep bonded to the second substrate.

After the first substrate is peeled off, the semiconductor element is mounted over a substrate for an IC card (hereinafter referred to as a card substrate) to peel off the second substrate. After that, the display element to be provided with the display device is formed. A protective substrate (hereinafter referred to as a covering material) for protecting the semiconductor element and the display element is bonded such that the covering material should cover the integrated circuit and the display device using the semiconductor element and the display element after the display element is formed. As a result, the integrated circuit and the display device are sandwiched between the card substrate and the covering material.

A thickness of the card substrate and the covering material is preferably set thin enough not to prevent the IC card itself from becoming thinner, specifically, several hundred μm.

The IC card may be complete at this stage, or mechanical strength of the IC card may be enhanced by sealing the card substrate and the covering material with a resin.

A display element of a display device may be manufactured after mounting the semiconductor element, or may be manufactured before the mounting. In this case, a covering material may be bonded after the second substrate is peeled off. When the thickness of the second substrate does not matter, the semiconductor element to which the second substrate is bonded may be complete.

In the case of manufacturing the display element after mounting the semiconductor element, in the process of manufacturing a liquid crystal display device, a pixel electrode of a liquid crystal cell electrically connected to a TFT that is one of semiconductor elements or an alignment film covering the pixel electrode is formed and then, the semiconductor element, the pixel electrode, and the alignment film are mounted over the card substrate. After that, an counter substrate that was manufactured separately is bonded to the pixel electrode and the alignment film, and a liquid crystal is injected to complete the liquid crystal display device. Over the surface of the covering material, an counter electrode, a color filter, a polarization plate, an alignment film, and the like are formed, which may be used instead of the counter substrate.

A thin film integrated circuit that was manufactured separately may be bonded and laminated to make a circuit scale or memory capacity larger. The IC card of the present invention is much thinner than that of a thin film integrated circuit manufactured using a silicon wafer, and thus, much more thin film integrated circuit film can be laminated and equipped in the limited area. Accordingly, it is possible to make a circuit scale or memory capacity larger keeping the area occupied by the layout of the thin film integrated circuit suppressed, thereby making the IC card have a higher function. Known methods for the connection such as a flip chip method, a TAB (Tape Automated Bonding) method, a wire-bonding, or the like may be employed to connect laminated thin film integrated circuits to one another.

An integrated circuit using a silicon wafer may be mounted and connected to the thin film integrated circuit. An inductor, a capacitor, a resistor and the like may be included in the category of the integrated circuit using a silicon wafer.

The thin film integrated circuit to be laminated or an integrated circuit using a silicon wafer is not limited to a mode to be directly equipped as a bare chip. The thin film integrated circuit or the integrated circuit can adopt a mode to be mounted, packaged over an interposer and equipped. The package can adopt various known modes such as DIP (Dual In-line Package), QFP (Quad Flat Package), SOP (Small Outline Package), or the like in addition to CSP (Chip Size Package), MCP (Multi Chip Package).

When multiple IC cards are formed from one large-size substrate, dicing is performed halfway to separate the thin film integrated circuit and the display device for each IC card.

According to the present invention, an ultrathin film integrated circuit having a total thickness of from 1 μm through 5 μm, typically, 2 μm can be formed by using a thin semiconductor film having a film thickness of 500 nm or less, although an integrated circuit formed using a silicon wafer has a thickness of about 50 μm. The thickness of a display device can be set to about 0.5 mm, preferably, about 0.02 mm. Accordingly, it is possible to provide a display device for an IC card having a thickness of from 0.05 mm through 1.5 mm.

According to the present invention, a glass substrate that is less expensive and larger than a silicon wafer can be used, and thus, thin film integrated circuits can be mass-produced at low cost and with high throughput. As a result, a manufacturing cost can be reduced dramatically. Further, it is possible to use a substrate repeatedly, thereby reducing the cost of the thin film integrated circuit.

The thin film integrated circuit does not need a back-grinding process required, different from an integrated circuit formed using a silicon wafer. The back-grinding process results in a crack or a grinding mark. Unevenness of the thickness depends on unevenness of each film making up a thin film integrated circuit in a film formation process, and thus, at most several hundred nm of unevenness can be seen. The unevenness can be suppressed dramatically, as compared with the unevenness of several to several tens μm due to the back-grinding process.

A thin film integrated circuit or a display device can be bonded in accordance with a shape of a card substrate, and thus, there is a lot of flexibility for a shape of an IC card. Therefore, for example, it is possible to form an IC card into a shape having a curved surface, which can be attached to a columnar bottle.

A liquid crystal display device, a light emitting device including a light emitting element typified by an organic light emitting element in each pixel, a DMD (Digital Micromirror Device), or the like can be employed as the display device. A microprocessor (CPU), a memory, a power source circuit, another digital circuit or analog circuit can be provided with the thin film integrated circuit. A driver circuit of the display device or a controller that generates a signal to be supplied to the driver circuit may be provided within the thin film integrated circuit.

The present invention is not limited to a card. The category of the present invention includes a portable recording medium that includes the thin film integrated circuit and the display device described above and that can transmit and receive data with a host.

BRIEF DESCRIPTION OF THE DRAWINGS

In the accompanying drawings:

FIGS. 5A to 5C show a method for manufacturing a semiconductor element;

FIGS. 6A and 6B show a method for manufacturing a semiconductor element;

FIGS. 7A and 7B show a method for manufacturing a semiconductor element;

FIGS. 8A and 8B show a method for manufacturing a semiconductor element;

FIGS. 9A and 9B show a method for manufacturing a semiconductor element;

FIGS. 15A to 15F are photographs of a thin film integrated circuit and a display device formed over a plastic substrate.

DETAILED DESCRIPTION OF THE PREFERRED EMBODIMENTS

Embodiment Mode

Figure 1A:
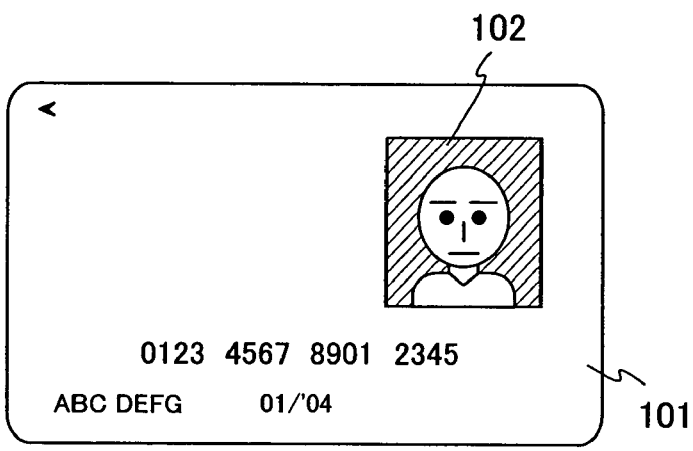
FIGS. 1A to 1C show an external view and an internal structure of an IC card of the present invention.

FIG. 1A shows a top view of an IC card according to the present invention. The IC card shown in FIG. 1A is a noncontact-type card for sending and receiving data with a reader/writer of terminal equipment without being electrically connected. Reference number 101 shows a card body. Reference number 102 corresponds to a pixel portion of a display device provided with the card body 101.

Figure 1B:
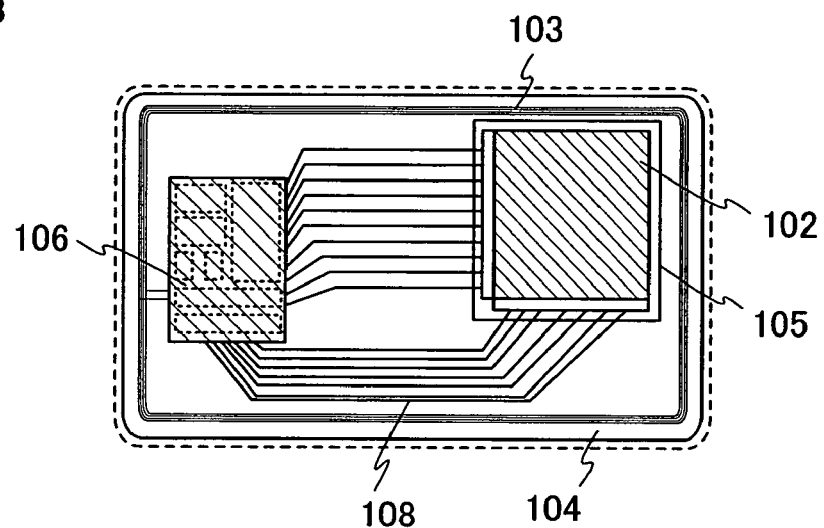

FIG. 1B shows a structure of a card substrate 104 sealed within the card body 101. A display device 105 and a thin film integrated circuit 106 are formed over one side of the card substrate 104. The display device 105 is electrically connected to the thin film integrated circuit 106 by a wiring 108.

An antenna coil 103 which is electrically connected to the thin film integrated circuit 106 is formed over the card substrate 104. Sending and receiving data with terminal equipment can be performed using electromagnetic induction by the antenna coil 103 without having a contact. As a result, the IC card is suffered from less damage by physical wear than a contact type IC card.

FIG. 1B shows an example of forming the antenna coil 103 over the card substrate 104. However, an antenna coil that is made separately may be equipped with the card substrate 104. For example, a copper wire is wound in coiled fashion and sandwiched between two plastic films having a thickness of about 100 μm and pressed, which can be used as an antenna coil.

Figure 1C:
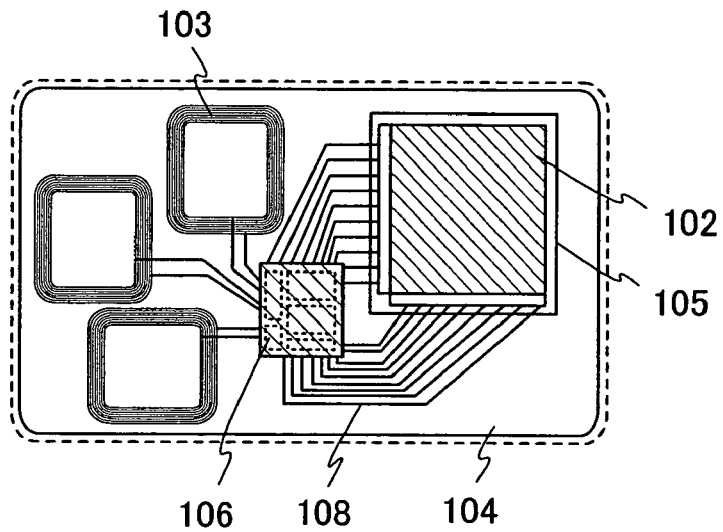

In FIG. 1B, one antenna coil 103 is used for one IC card. However, a plurality of antenna coils 103 may be used as shown in FIG. 1C.

A method for manufacturing a thin film integrated circuit and a display device is described. Note that, in this embodiment mode, although a TFT is given as an example of a semiconductor element, the semiconductor element included in the thin film integrated circuit and the display device is not limited thereto, and any circuit element can be used. For example, a memory element, a diode, a photoelectric transferring element, a resistor element, a coil, a capacitor element, or an inductor can be given as a representative example in addition to a TFT.

As shown in FIG. 5A, a metal film 501 is formed on a first substrate 500 by sputtering. The metal film 501 includes tungsten to be from 10 nm to 200 nm, preferably from 50 nm to 75 nm in thickness. In this embodiment mode, the metal film 501 is formed directly on the first substrate 500. However, the first substrate 500 may be covered with an insulating film containing such as silicon oxide, silicon nitride, silicon nitride-oxide and then, the metal film 501 may be formed thereover.

After the metal film 501 is formed, an oxide film 502 to serve as an insulating film is formed to be laminated without being exposed to air. A silicon oxide film is formed to be from 150 nm to 300 nm in thickness as the oxide film 502. When the sputtering method is employed, an edge face of the first substrate 500 is also deposited. Therefore, preferably, the metal film 501 and the oxide film 502 deposited in the edge face are selectively removed by $O_2$ ashing or the like in order to prevent the oxide film 502 from remaining on the side of the first substrate 500 in a later process for peeling off.

When the oxide film 502 is formed, a pre-sputtering for generating plasma by blocking a target from a substrate with a shutter is conducted as a preliminary step to sputtering. The pre-sputtering is conducted under conditions where the flow rates of Ar and $O_2$ are set to 10 sccm and 30 sccm, respectively, the temperature of the first substrate 500 is set to 270° C., and deposition power is kept 3 kW in an equilibrium situation. An ultrathin metal oxide film 503 of several nm (here, 3 nm) is formed between the metal film 501 and the oxide film 502. The surface of the metal film 501 is oxidized to form the metal oxide film 503. Accordingly, the metal oxide film 503 includes tungstic oxide in this embodiment mode.

In this embodiment mode, the metal oxide film 503 is formed by the pre-sputtering. However, the present invention is not limited to the method. For example, the metal oxide film 503 may be formed by oxidizing deliberately the surface of the metal film 501 by plasma in the atmosphere of oxygen or oxygen added with inert gases such as Ar.

After forming the oxide film 502, a base film 504 constituting an insulating film is formed by PCVD (plasma CVD). Here, a silicon oxynitride film is formed to have a thickness approximately of 100 nm as the base film 504. After forming the base film 504, a semiconductor film 505 is formed without being exposed to air. The semiconductor film 505 is formed to have a thickness of from 25 nm to 100 nm, preferably, from 30 nm to 60 nm. The semiconductor film 505 may be an amorphous semiconductor or a polycrystalline semiconductor. Silicon germanium as well as silicon may be used for a semiconductor. In the case of using silicon germanium, the concentration thereof is preferably approximately from 0.01 to 4.5 atomic %.

The semiconductor film 505 is crystallized by a known technique. As known methods of crystallization, there are thermo-crystallization method using an electric heating furnace, laser crystallization method using a laser beam, and lamp annealing crystallization method using an infrared ray. Alternatively, a crystallization method using a catalytic element may be conducted according to a technique described in Japanese Published Unexamined Application No. H07-130652.

In this embodiment mode, the semiconductor film 505 is crystallized by a laser crystallization. Before the laser crystallization, a thermal annealing process is performed on the semiconductor film for an hour at 500° C. to enhance a resistance of the semiconductor film to a laser beam. In this embodiment mode, brittleness of the metal oxide film 503 is enhanced by the heat treatment, and thus, the first substrate is peeled off more easily later. The metal oxide film 503 is easily cracked by the crystallization, and the brittleness thereof is enhanced. In this embodiment mode, the crystallization of the metal oxide film 503 is preferably performed for from 0.5 to 5 hours at temperatures from 420° C. to 550° C.

It is possible to obtain crystals having a large grain size by emitting a laser beam of second to fourth harmonics of a fundamental harmonic with a solid-state laser that is capable of continuously oscillating. Typically, it is preferable to use second harmonic (wavelength: 532 nm) or third harmonic (wavelength: 355 nm) of Nd: $YVO_4$ laser (fundamental harmonic, wavelength: 1064 nm). Specifically, a laser beam emitted from continuous wave type $YVO_4$ laser is converted to the harmonic with a non-linear optical element to obtain the output power of 10 W. Further, there is a method of emitting a harmonic with a non-linear optical element. Preferably, the laser beam is formed to have a rectangular shape or an elliptical shape on a surface to be irradiated by using an optical system. The semiconductor film 505 is irradiated with the above-described laser beam. On this occasion, an energy density approximately from 0.01 $MW/cm^2$ to 100 $MW/cm^2$ (preferably from 0.1 $MW/cm^2$ to 10 $MW/cm^2$) is necessary. The scanning speed thereof is set to approximately from 10 cm/s to 2000 cm/s for emitting the laser beam.

The laser crystallization may be conducted by emitting laser beams of a fundamental wave and a harmonic of a continuous wave, or emitting a laser beam of a fundamental wave of a continuous wave and a laser beam of a harmonic of a pulse oscillating laser.

A laser beam may be emitted in the inert gas atmosphere such as noble gas or nitrogen. According to this, the surface roughness of a semiconductor due to laser beam irradiation, and further, fluctuation in a threshold voltage due to the variations of interface state density can be prevented.

A semiconductor film 506 whose crystallinity is enhanced by the above described laser irradiation on the semiconductor film 505 is formed. The semiconductor film that is a polycrystalline semiconductor film may be formed in advance by sputtering, plasma CVD, thermal CVD, or the like.

Then, as shown in FIG. 5B, the semiconductor film is patterned to form island-like semiconductor films 507 and 508. Various semiconductor elements as typified by a TFT are formed using the island-like semiconductor films 507 and 508. In this embodiment mode, the island-like semiconductor films 507 and 508 are in contact with the base film 504, but an electrode, an insulating film, or the like may be formed between the base film 504 and the island-like semiconductor films 507 and 508 depending on a semiconductor element. For example, in the case of a bottom gate type TFT that is one of the semiconductor elements, a gate electrode and a gate insulating film are formed between the base film 504 and the island-like semiconductor films 507 and 508.

In this embodiment mode, top gate TFTs 509 and 510 are formed using the island-like semiconductor films 507 and 508 (FIG. 5C). Specifically, a gate insulating film 511 is formed so as to cover the island-like semiconductor films 507 and 508. Then, a conductive film is formed over the gate insulating film 511 and patterned, and thus, gate electrodes 512 and 513 are formed. Further, in this embodiment mode, the conductive film is patterned to form the antenna coil 506. Next, impurities imparting n-type are added to the island-like semiconductor films 507 and 508 by using the gate electrodes 512 and 513 or a resist that is formed and patterned as a mask to form a source region, a drain region, an LDD (Lightly Doped Drain) region and the like. Here, both TFTs 509 and 510 are n-type, but impurities imparting p-type are added in the case of using p-type TFTs.

According to the above-described process, TFTs 509 and 510 can be formed. A method for manufacturing the TFTs is not limited to the above-described process. The method for electrically connecting the antenna coil 506 to the thin film integrated circuit is not limited to the above-mentioned mode.

A first interlayer insulating film 514 is formed so as to cover the TFTs 509, 510 and the antenna coil 506. Contact holes are provided with the gate insulating film 511 and the first interlayer insulating film 514, and then, wirings 515 to 518 connected to the TFTs 509, 510 and the antenna coil 506 through the contact holes are formed so as to be in contact with the first interlayer insulating film 514.

The TFT 509 used for the thin film integrated circuit is electrically connected to the antenna coil 506 by the wiring 515. It is not always necessary to form the antenna coil 506 from the same conductive film as that of the gate electrode. The antenna coil 506 may be formed from the same conductive film as that of the wiring 515 to 518.

The TFT 510 to be used for as a switching element of a pixel portion in a display device is electrically connected to the wiring 518, and a part of the wiring 518 serves also as a pixel electrode of a liquid crystal cell to be formed in a later process.

A spacer 519 using an insulating film is formed. An alignment film 520 is formed to cover the wiring 518 and the spacer 519 and a rubbing treatment is performed to the alignment film 520. Note that, the alignment film 520 may be formed in order to be overlapped with the thin film integrated circuit or the antenna coil 506.

Then, a sealing material 521 is formed to seal a liquid crystal in. As shown in FIG. 6A, the liquid crystal 522 are dropped into the area surrounded by the sealing material 521.

An counter substrate 523 formed separately is bonded by the sealing material 521. A filler may be mixed into the sealing material. The counter substrate 523 has a thickness of about several hundred μm, and a counter electrode 524 including a transparent conductive film and an alignment film 526 on which a rubbing treatment is performed are formed on the counter substrate 523. Further, a color filter or a blocking layer for preventing disclination may be provided with the counter substrate. A polarization plate 527 is bonded to the opposite side of the counter electrode 524 in the counter substrate 523.

A portion in which the counter electrode 524, the liquid crystal 522, and the wiring 518 are laminated corresponds to a liquid crystal cell 528. The liquid crystal cell 528 is completed, and thus, the display device 529 is also completed. In this embodiment mode, the counter substrate 523 is not overlapped with the thin film integrated circuit 530. However, the counter substrate 523 may be allowed to be overlapped with the thin film integrated circuit 530. In this case, a resin having an insulating property is filled between the counter substrate and the thin film integrated circuit for the sake of enhancing the mechanical strength of the IC card.

A liquid crystal is sealed in by a dispenser method (a dripping method) in this embodiment mode. The present invention is not limited to the method. A dip method (pumping up method) by which a liquid crystal is sealed in using capillary phenomenon after bonding the counter substrate may be employed.

As shown in FIG. 7A, a protective layer 531 is formed to cover the thin film integrated circuit 530 and the display device 529. As a material for forming the protective layer 531, a material which can protect the thin film integrated circuit 530 and the display device 529 and which can be removed after peeling off a second substrate is used, in a later process of bonding or peeling off the second substrate. For example, the protective layer 531 can be formed by coating an epoxy, acrylate, or silicon resin that is soluble in water or alcohol over the whole surface.

In this embodiment mode, water-soluble resin (TOAGOSEI Co., Ltd.: VL-WSHL10) is spin-coated to have a thickness of 30 μm, and exposed for two minutes to be tentatively cured, then, exposed on its back to UV rays for 2.5 minutes, and then, exposed on its front surface for 10 minutes, namely total 12.5 minutes to be fully cured. Consequently, the protective layer 531 is formed.

In the case of stacking a plurality of organic resins, there is a risk of melting partially the stacked organic resins depending on the used solvent during coating or baking, or increasing the adhesion thereof excessively. Therefore, in the case of using both the first interlayer insulating film 514 and the protective layer 531 of organic resins that are soluble in the same solvent, an inorganic insulating film (a $SiN_X$ film, a $SiN_XO_Y$ film, an $AlN_X$ film, or an $AlN_XO_Y$ film) is preferably formed to cover the first interlayer insulating film 514 so as to remove smoothly the protective film 531 in a later process.

Then, some treatments are carried out in order to make peeling-off easier by weakening partly the adhesion between the metal oxide film 503 and the oxide film 502 or the adhesion between the metal oxide film 503 and the metal film 501. Specifically, a part of the inside or a part of the vicinity of the interface of the oxide film 503 is damaged by pressuring locally from outside along with the periphery of a region to be separated. Specifically, a hard needle such as a diamond pen may perpendicularly be pressed on the periphery of the edge portion of the metal oxide film 503 and moved along the metal oxide film 503 with applying loading. Preferably, a scriber device can be used to move the pen with applying stress with plunging depth from 0.1 mm to 2 mm. As described above, a portion having weakened adhesion that can spark the start of peeling-off is formed before the peeling-off is preformed, thereby preventing poor peeling-off in a later process of the peeling-off and improving the process yield.

Next, a second substrate 533 is pasted over the protective layer 531 with a two-sided tape 532, and a third substrate 535 is pasted over the first substrate 500 with a twp-sided tape 534. An adhesive may be used instead of the two-sided tape. For example, it is possible to reduce the load that is applied to the semiconductor element in peeling off the second substrate, by using an adhesive that is peeled off by UV light. The third substrate 535 is bonded to prevent the destruction of the first substrate 500 in a later peeling-off process. For the second substrate 533 and the third substrate 535, the substrate that has higher rigidity than that of the first substrate 500, for example, a quartz substrate or a semiconductor substrate is preferably to be used.

Then, the metal film 501 is separated from the oxide film 502 by a physical means. The peeling-off is started from the region in which adhesion of the metal oxide film 503 to the metal film 501 or the oxide film 502 is partly weakened in the previous process.

Three cases of separated portions are consider to occur from the peeling-off of metal film 501, that is, a portion in which the metal film 501 is separated from metal oxide film 503, a portion in which the oxide film 502 is separated from the metal oxide film 503, or a portion in which the metal oxide film 503 is itself separated to two sides. Further, the second substrate 533 on which semiconductor elements (here, TFTs 509 and 510) are pasted is separated from the third substrate 535 on which the first substrate 500 and the metal film 501 are pasted. The peeling-off can be carried out with comparatively small force (for example, man's power, air pressure of gas sprayed from a nozzle, ultrasonic waves, or the like). FIG. 7B shows a state after the peeling-off process.

A card substrate 540 is bonded to the oxide film 502 to a part of which the metal oxide film 503 is attached with an adhesive 539 (FIG. 8A). In the adhesive bonding, it is important to select a material for the adhesive 539 so that adhesion degree between the oxide film 502 and the card substrate 540 by the adhesive 539 is higher than that between the second substrate 533 and the protective layer 531 by the two-sided tape 532.

As the adhesive 539, various curing adhesives such as a photo-curing adhesive, for example, a reaction-curing adhesive, a thermal-curing adhesive, or a light curing adhesive such as UV-curing adhesive, and an anaerobic adhesive can be used. The adhesive 539 is given high thermal conductivity by being mixed with powder comprising silver, nickel, aluminum, or aluminum nitride, or filler.

Note that, in some cases, the adhesion with the card substrate 540 becomes worse since the metal oxide film 503 is left in a surface of the oxide film 502. For the sake of preventing that, the metal oxide film 503 may be removed completely, and then, bonded to a card substrate to enhance the adhesion.

As shown in FIG. 8B, the two-sided tape 532 and the second substrate 533 are separated sequentially or simultaneously from the protective layer 531.

As shown in FIG. 9A, the protective layer 531 is removed. Here, the protective layer 531 is removed by water since the protective layer 531 is formed of the resin that is soluble in water. In the case where the left protective layer 531 causes defect, a part of the left protective layer 531 is preferably removed by carrying out cleaning treatment or $O_2$ plasma treatment on the surface after the removing process.

Next, as shown in FIG. 9B, the thin film integrated circuit 530 and the display device 529 are covered with a resin 542, and then, a covering material 543 is provided to protect the thin film integrated circuit 530 and the display device 529. The IC card may be complete at this stage, or sealing is performed with a sealant so that the card substrate 540 and the covering material 543 may be covered. The covering material 543 is not always required to be provided, and the card substrate 540 may be sealed with sealant.

Materials used generally can be used for sealing the IC card, for example, polymeric material such as polyester, acrylic acid, polyvinyl acetate, propylene, chloroethene, acrylonitrile-butadiene-styrene resin, or polyethylene terephthalate can be used. When the sealing is performed, the pixel portion of the display device is exposed. In the case of a contact-type IC card, the connection terminals as well as the pixel portion are exposed. The IC card having an appearance shown in FIG. 1A can be formed by the sealing.

Sealing with the sealant offers some advantages of enhancing mechanical strength of the package, radiating heat generated in the thin film integrated circuit and the display device, and shielding electromagnetic noises from circuits adjacent to the IC card.

A plastic substrate can be used for the card substrate 540, the covering material 543, and the counter substrate 523. ARTON (manufactured by JSR corporation) containing a norbornene resin including a polarized functional group can be used for the plastic substrate. Polyethylene terephthalate (PET), polyether sulfone (PES), polyethylene naphthalate (PEN), polycarbonate (PC), nylon, polyetheretherketone (PEEK), polysulfone (PSF), polyetherimide (PEI), polyarylate (PAR), polybutylene telephthalate (PBT), or polyimide can be used for the plastic substrate. The card substrate 540 preferably has high thermal conductivity of approximately from 2 W/mK to 30 W/mK for radiating heat generated in the thin film integrated circuit or the display device.

In this embodiment mode, tungsten is used for the metal film 501, however, the present invention is not limited thereto. Any material can be used as long as the material includes a metal that allows a substrate to be peeled off by forming the metal oxide film 503 over the surface of the material and crystallizing the metal oxide film 503. For example, TiN, WN, Mo or the like as well as W can be used. When alloy of the elements is used as a metal film, the optimum temperature for a heat treatment in crystallization is different depending on the composition ratio thereof. Accordingly, the heat treatment can be performed at a temperature that is not interference in the process for manufacturing a semiconductor element by adjusting the composition ratio, and therefore, there are few limitations in choices for the process for a semiconductor element.

In the laser crystallization, each thin film integrated circuit is formed in a region which is within a width in a direction perpendicular to the scanning direction of a beam spot of laser beam, which prevents the thin film integrated circuits from being exposed to the beam of regions having poor crystallinity (edges) at both end portions of the longitudinal axis of the beam spot. According to this, a semiconductor film having few crystal grain boundaries can be used for a semiconductor element in the thin film integrated circuit.

According to the above-described method for manufacturing, an ultrathin film integrated circuit having a total thickness of from 1 μm through 5 μm, typically, 2 μm can be formed. The thickness $W_{DP}$ of a display device can be set to about 0.5 mm, preferably, about 0.02 mm. Accordingly, it is possible to provide the display device for an IC card having a thickness of from 0.05 mm through 1.5 mm. The thickness $W_{IC}$ of the thin film integrated circuit includes a thickness of an insulating film provided between the metal oxide film and the semiconductor element, a thickness of an interlayer insulating film to cover the formed semiconductor element in addition to the thickness of the semiconductor element itself.

The liquid crystal display device described in this embodiment mode is reflective type. As long as a backlight can be provided with the liquid display device, it may be a transmissive type. When the reflective liquid crystal display device is used, it is possible to reduce power consumption required for displaying an image more, as compared with a transmissive one. However, when the transmissive liquid crystal display device is used, an image can be seen more easily in the dark, as compared with the reflective one.

The display device of the present invention is required to have a high resolution enough that a person can be recognized with a photograph of the person's face. Therefore, for the sake of using the display device instead of an identification photograph, at least QVGA (320×240) of resolution is to be required.

Figure 2A:
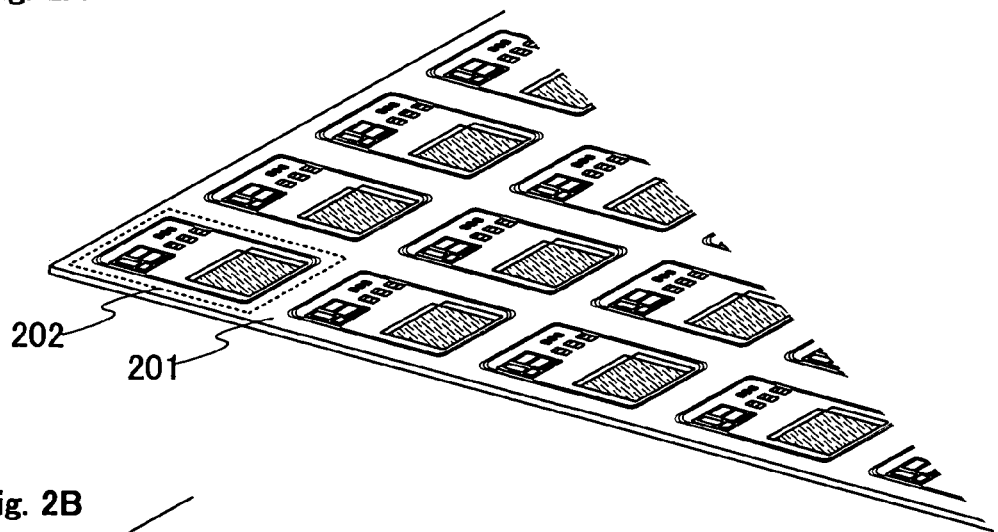
FIGS. 2A to 2C show a method for manufacturing an IC card using a large-size card substrate according to the present invention.

Next, an example of manufacturing a plurality of IC cards using a large-size substrate is described. FIG. 2A shows a state in which a display device, an antenna coil, and an integrated circuit corresponding to a plurality of IC cards are formed over a large-size substrate 201. FIG. 2A shows a state before a covering material is bonded by a resin after a protective layer is removed. A region 202 surrounded by a broken line corresponds to one IC card. In the case of using a liquid crystal display device as a display device, a liquid crystal may be injected by a dispenser method or a dip method. However, a dispense method is employed when an injection port for a liquid crystal for the dip method cannot be arranged in an edge portion of a substrate as shown in FIG. 2A.

Figure 2B:
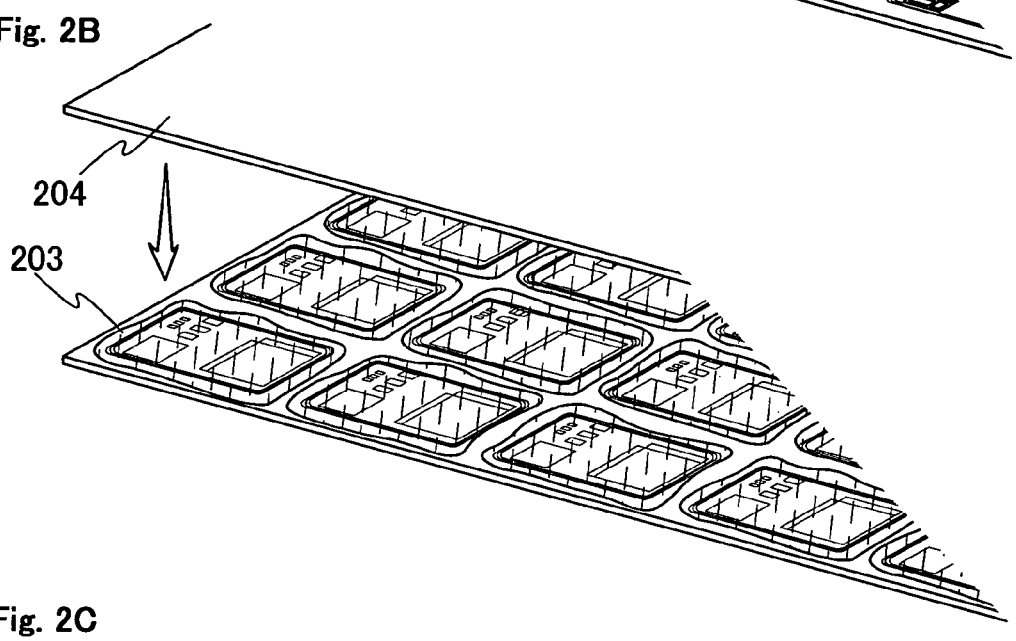

A resin 203 is applied to cover the integrated circuit, the display device, and the antenna coil corresponding to each of IC cards as shown in FIG. 2B. In FIG. 2B, regions to be applied with the resin 203 are each separated for corresponding to each IC card. However, the resin may be applied to a whole area.

Figure 2C:
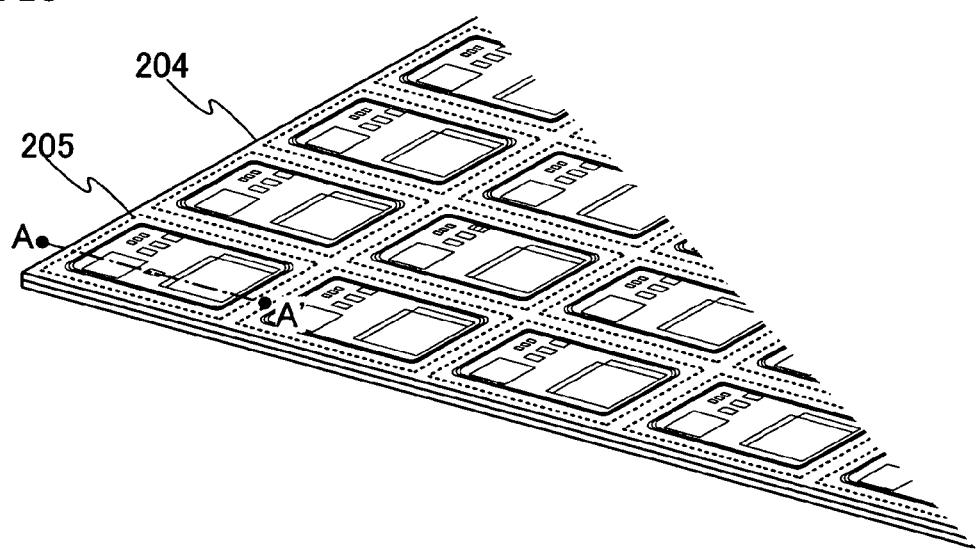

A covering material 204 is bonded as shown in FIG. 2C. Dicing is performed in a position of a broken line 205, and then IC cards are separated from one another. The IC card may be complete at this stage, and also may be complete by sealing with a sealant thereafter.

Figure 3A:
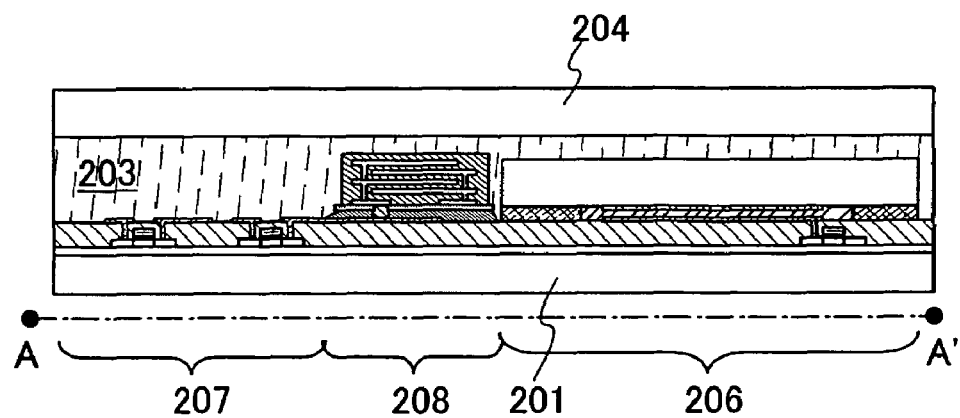
FIGS. 3A and 3B are cross-sectional views of an IC card of the present invention.

FIG. 3A is a cross sectional view along a broken line A-A' in FIG. 2C. An integrated circuit 208 formed by using a silicon wafer as well as a thin film integrated circuit 207 and a display device 206 is provided between the card substrate 201 and the covering material 204. A capacitor, an inductor, a resistor and the like may be included in the category of the integrated circuit.

Figure 3B:
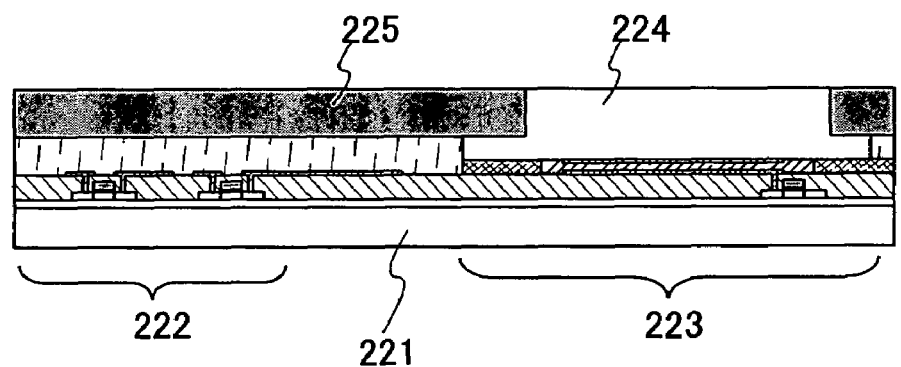

FIG. 3B shows a cross-sectional view of an IC card having a different structure from that shown in FIG. 3A. A thin film integrated circuit 222 and a display device 223 are provided with a card substrate 221 in the IC card shown in FIG. 3B. A part of a substrate 224 sealing a display element of the display device is exposed in an opening portion provided with a covering material 225 in FIG. 3B. The substrate 224 contains a transparent material. Specifically, the substrate 224 corresponds to a counter substrate in the case of a liquid crystal display device, and a substrate for sealing a light emitting element in the case of a light emitting display device, for example. The covering material 225 contains a lightproof material. The card substrate 221 may also contain a light proof material. According to the above-described structure, light can be transmitted through a pixel portion alone.

Figure 4:
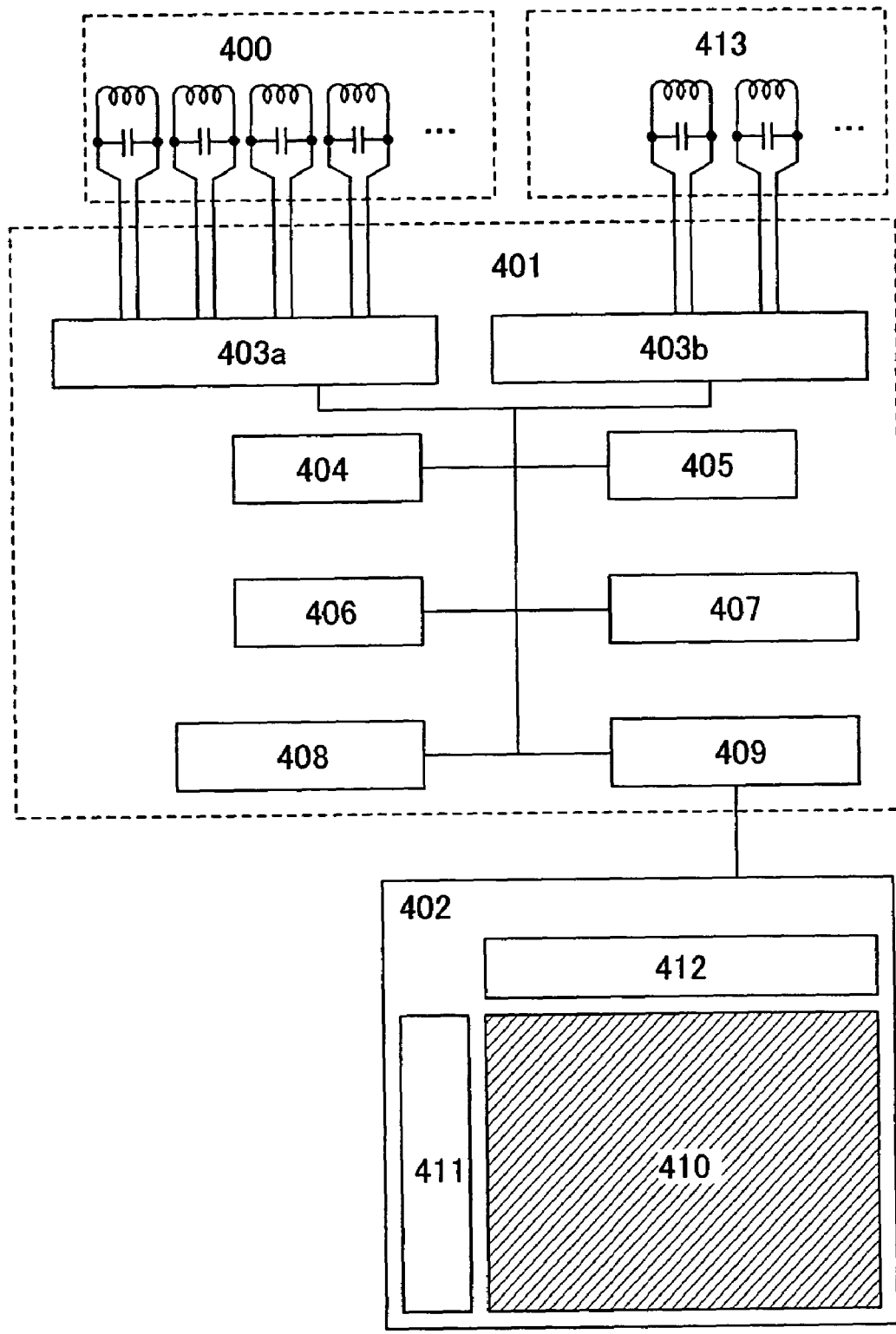
FIG. 4 is a block diagram of a thin film integrated circuit and a display device.

Next, one mode of a structure of a thin film integrated circuit and a display device in a noncontanct type IC card is described. FIG. 4 shows a block diagram of a thin film integrated circuit 401 and a display device 402 that are provided with an IC card of the present invention.

Reference number 400 denotes an input antenna coil, 413 denotes an output antenna coil. 403a denotes an input interface, 403b denotes an output interface. It is noted that the number of each antenna coil is not limited to the number shown in FIG. 4.

AC power supply voltage or various signals inputted from a terminal equipment by the input antenna coil 400 are demodulated or made a direct current in the input interface 403a, and then supplied to each circuit. Various signals outputted from the thin film integrated circuit 401 are modulated in the output interface 403b, and sent to the terminal equipment by the output antenna coil 413.

A CPU 404, a ROM 405, a RAM 406, an EEPROM 407, a coprocessor 408, and a controller 409 are provided with the thin film integrated circuit 401 shown in FIG. 4.

All processes of the IC card are controlled by the CPU 404. Each program used in the CPU 404 is memorized in the ROM 405. The coprocessor 408 is a secondary coprocessor for helping with operation of the main CPU 404. The RAM 406 is used as an operation area during data processing as well as a buffer during a communication with terminal equipment. The EEPROM 407 can memorize data inputted as a signal in a determined address.

Note that, image data such as a photograph of a face is memorized in the EEPROM 407 when the data can be rewritten, and in the ROM 405 when the data cannot be rewritten. Alternatively, another memory for memorizing image data may be provided.

A signal including image data is exposed to data processing in accordance with a specification of the display device 402 and supplied to the display device 402 as a video signal by the controller 409. An Hsync signal, Vsync signal, clock signal CLK, and an alternating voltage (AC Cont), etc. are generated based on respective signals or power supply voltage inputted from the input interface 403a and are supplied to the display device 402 by the controller 409.

A pixel portion 410 in which a display element is provided with each pixel, a scanning line driver circuit 411 for selecting a pixel provided with the pixel portion 410, and a signal line driver circuit 412 for supplying a video signal to the selected pixel are provided with the display device 402.

Figure 10A:
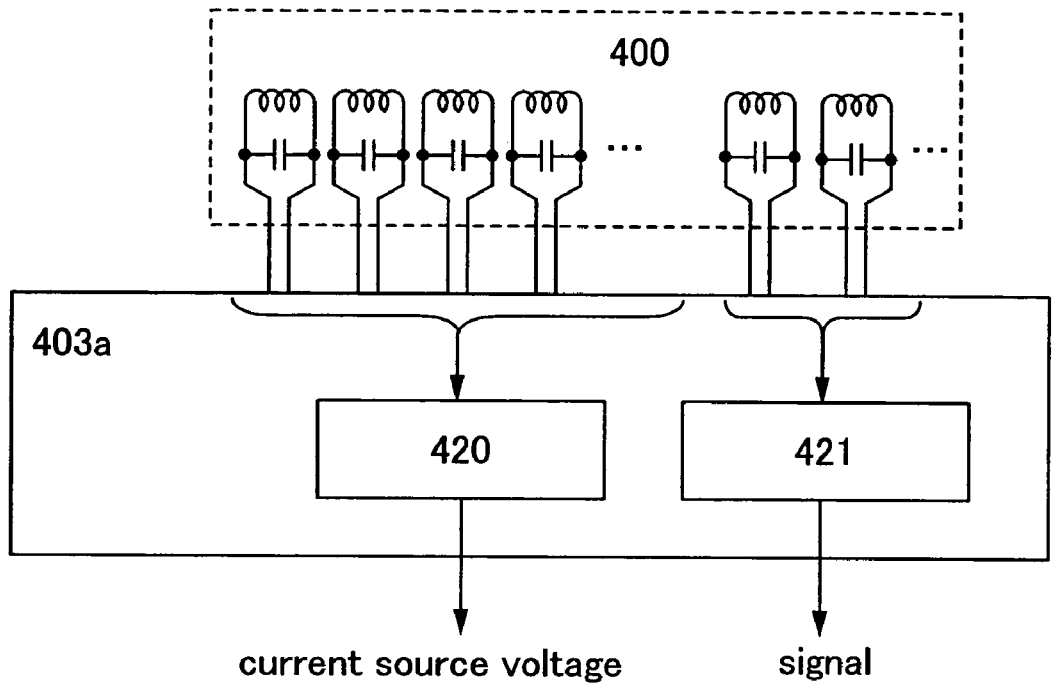
FIGS. 10A and 10B are block diagrams showing structures of an input interface and an output interface.

FIG. 10A shows a more detailed structure of the input interface 403a. A rectification circuit 420 and a demodulation circuit 421 are provided with the input interface 403a shown in FIG. 10A. AC power supply voltage inputted from the input antenna coil 400 is rectified in the rectification circuit 420 and supplied to each circuit within the thin film integrated circuit 401 as DC power supply voltage. Each of AC signals inputted from the input antenna coil 400 is demodulated in the demodulation circuit 421, and various signals waveform-shaped by demodulation are supplied to each circuit within the thin film integrated circuit 401.

Figure 10B:
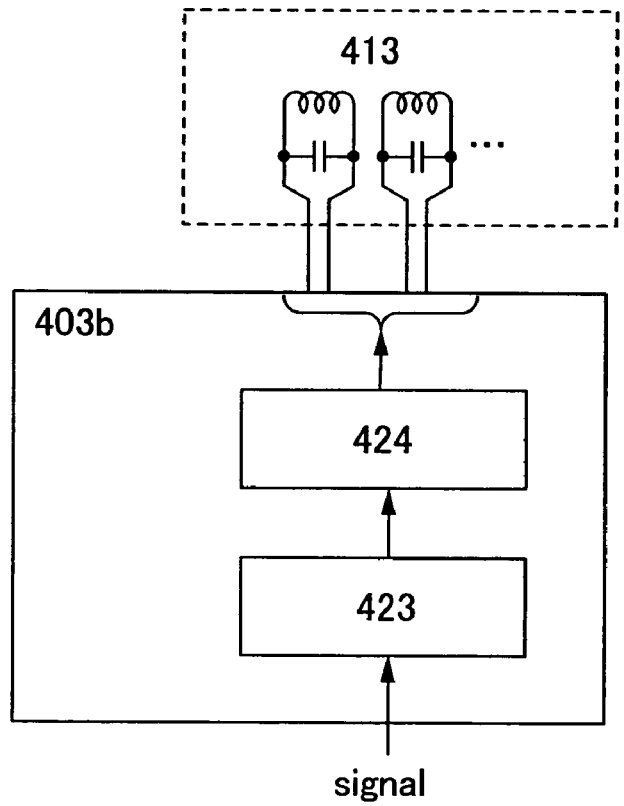

FIG. 10B shows a more detailed structure of the output interface 403b. A modulation circuit 423 and an amplifier 424 are provided with the output interface 403b shown in FIG. 10B. Various signals that are inputted to the output interface 403b from each circuit within the thin film integrated circuit 401 are modulated in the modulation circuit 423, amplified or buffer-amplified in the amplifier 424, and then, sent to the terminal equipment from the output antenna coil 413.

In this embodiment mode, an example of a noncontact type using a coil antenna is shown. However, the noncontact type IC card is not limited thereto. A light emitting element, an optical sensor or the like may be used for sending and receiving data.

Figure 14A:
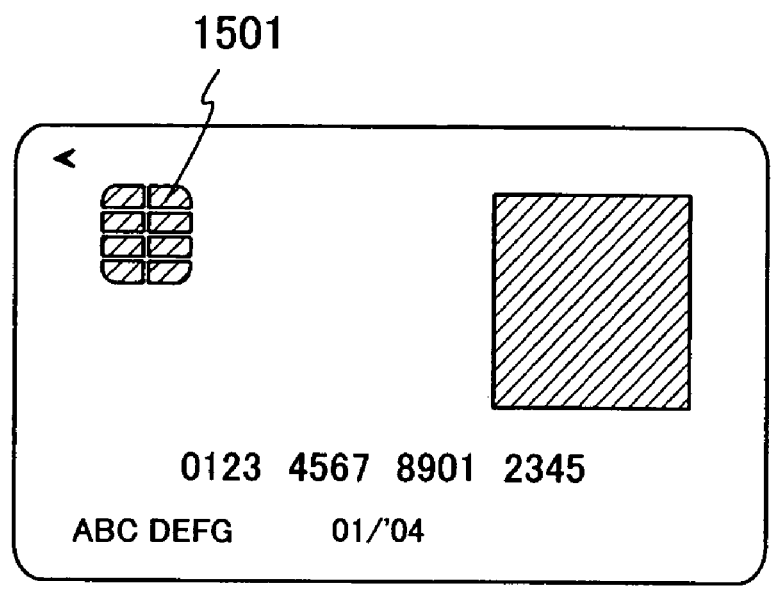
FIGS. 14A and 14B show an external view of an IC card of the present invention.

An IC card of the present invention is not limited to a noncontact type card, but may be a contact type card. FIG. 14A shows an external view of a contact-type IC card. A connection terminal 1501 is provided with the contact type IC card, and it is possible to send and receive data by electrically connecting a connection terminal 1501 to a reader/writer of terminal equipment.

Figure 14B:
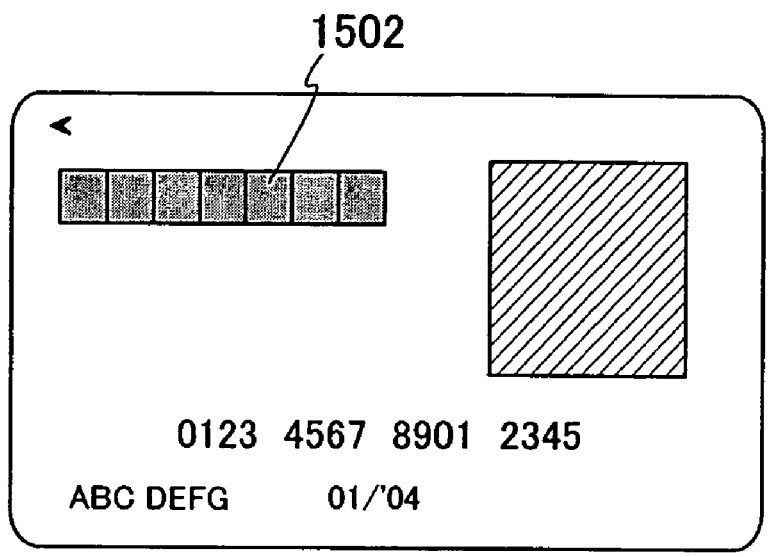

Further, in this embodiment mode, an example of supplying a power supply voltage from a reader/writer of terminal equipment. However, the present invention is not limited thereto. For example, as shown in FIG. 14B, a solar battery 1502 may be provided with the IC card. An ultrathin type battery such as a lithium battery may be incorporated.

The structures, shown in FIG. 4 and FIG. 10, of the thin film integrated circuit 401 and the display device 402 are each one example. The present invention is not limited to the structures. The display device 402 is admissible as long as it includes a function for displaying an image, and may be an active type or a passive type. The thin film integrated circuit 401 is admissible as long as it includes a function for supplying a signal for controlling the driving of the display device 402 to the display device 402. Additionally, for example, functions such as GPS (global positioning system) may be provided.

It is possible to make changing a photograph of a human face more difficult by displaying data of human face in the display device, as compared with the case of using the printing method. It is also possible to prevent a card forgery and ensure a security of an IC card by memorizing the data of human face in a memory such as ROM in which data cannot be changed. Further, more ensured prevention of forgery can be obtained by configuring the card so that ROM is broken when the IC card is tore down forcibly.

A semiconductor film, an insulating film or the like used in a display device may be incused with a serial number. If a third person obtains illegally an stolen IC card in which image data is not memorized in a ROM, it is possible to trace the distribution route by the serial number to some extent. In this case, it is efficient to incuse a serial number in a part in which the serial number can be deleted, only when the display device is tore down irreparably and cannot be repaired.

A plastic substrate has a poor heat resistance up to a temperature in the manufacturing process of a semiconductor element, and is difficult to use. However, according to the present invention, a glass substrate, silicon wafer or the like having relatively high heat resistance up to a temperature in the manufacturing process including a heat treatment is used and a semiconductor element can be transported to a plastic substrate, after the manufacturing process is finished. As a result, the thin film integrated circuit and the display device can be formed over the plastic substrate that is thinner than a glass substrate or the like. Although a display device formed by using a glass substrate has a thickness of at least 2 mm to 3 mm, a display device can have a thickness of approximately 0.5 mm, preferably 0.02 mm by using a plastic substrate, and thus the display device becomes much thinner dramatically according to the present invention. The display device can be made much thinner, thereby making it possible to provide the display device for an IC card having a thickness of from 0.05 mm through 1.5 mm and to realize multi-functionality of the IC card without preventing an IC card from becoming smaller and lighter.

According to the present invention, it is possible to provide a larger number of thin film integrated circuits having a larger memory capacity or a larger circuit scale within the limited area of the IC card by laminating the thin film integrated circuits, since a thin film integrated circuit that is extremely thin can be formed according to the present invention.

A thin film integrated circuit or a display device can be bonded in accordance with a shape of a card substrate, and thus, there is a lot of flexibility for a shape of an IC card. Therefore, for example, it is possible to form an IC card into a shape having a curved surface, which can be attached to a columnar bottle.

EMBODIMENTS

Hereinafter, embodiments of the present invention are described.

Embodiment 1

In this embodiment, a liquid crystal material used when a first substrate is peeled-off after a liquid crystal display device is completed is described.

Figure 11A:
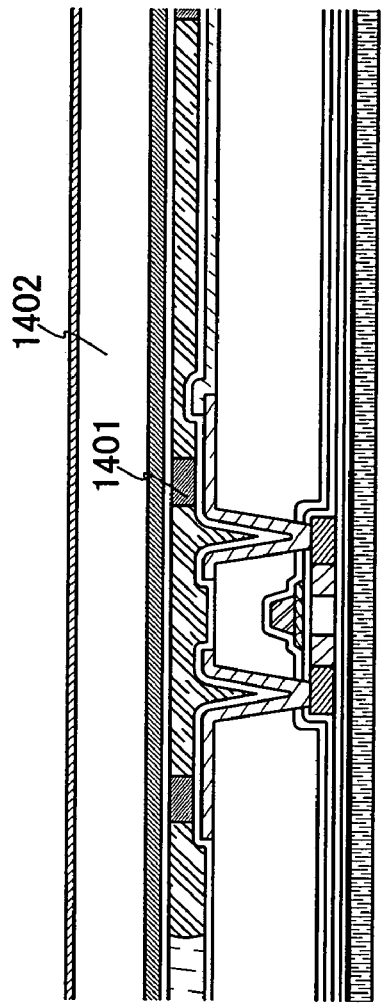
FIGS. 11A and 11B are cross-sectional views of a liquid crystal display device.
Figure 11B:
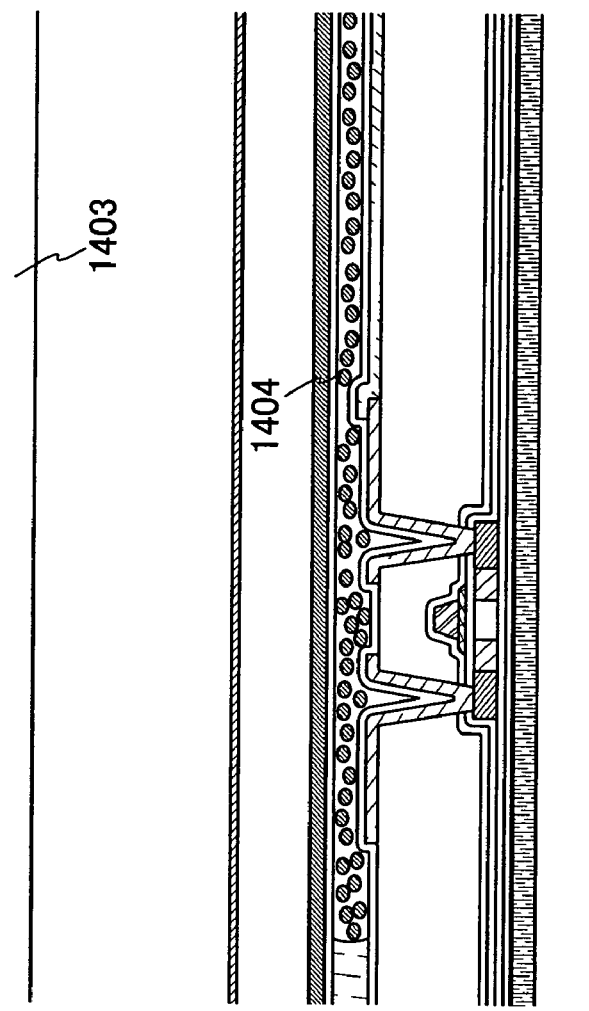

FIGS. 11A and 11B are cross sectional views of a liquid crystal display of this embodiment. A columnar spacer 1401 is provided with a pixel in a liquid crystal display device shown in FIG. 11A. Adhesion between a counter substrate 1402 and a substrate 1403 on the side of elements is enhanced by the columnar spacer 1401. This makes it possible to prevent a semiconductor element in the outside of the area overlapping with a sealing material from remaining on the side of the first substrate, when the first substrate is peeled off.

FIG. 11B is a cross sectional view of a liquid crystal display device using nematic liquid crystal, smectic liquid crystal, ferroelectric liquid crystal, or PDLC (polymer dispersed liquid crystal) in which the above described liquid crystal is included in polymer resin. Adhesion between the counter substrate 1402 and the substrate 1403 on the side of elements is enhanced by PDLC 1404. This makes it possible to prevent a semiconductor element in the outside of the area overlapping with a sealing material from remaining on the side of the first substrate, when the first substrate is peeled off.

Embodiment 2

In this embodiment, a structure of a light-emitting device provided with the IC card in the present invention is described.

Figure 12:
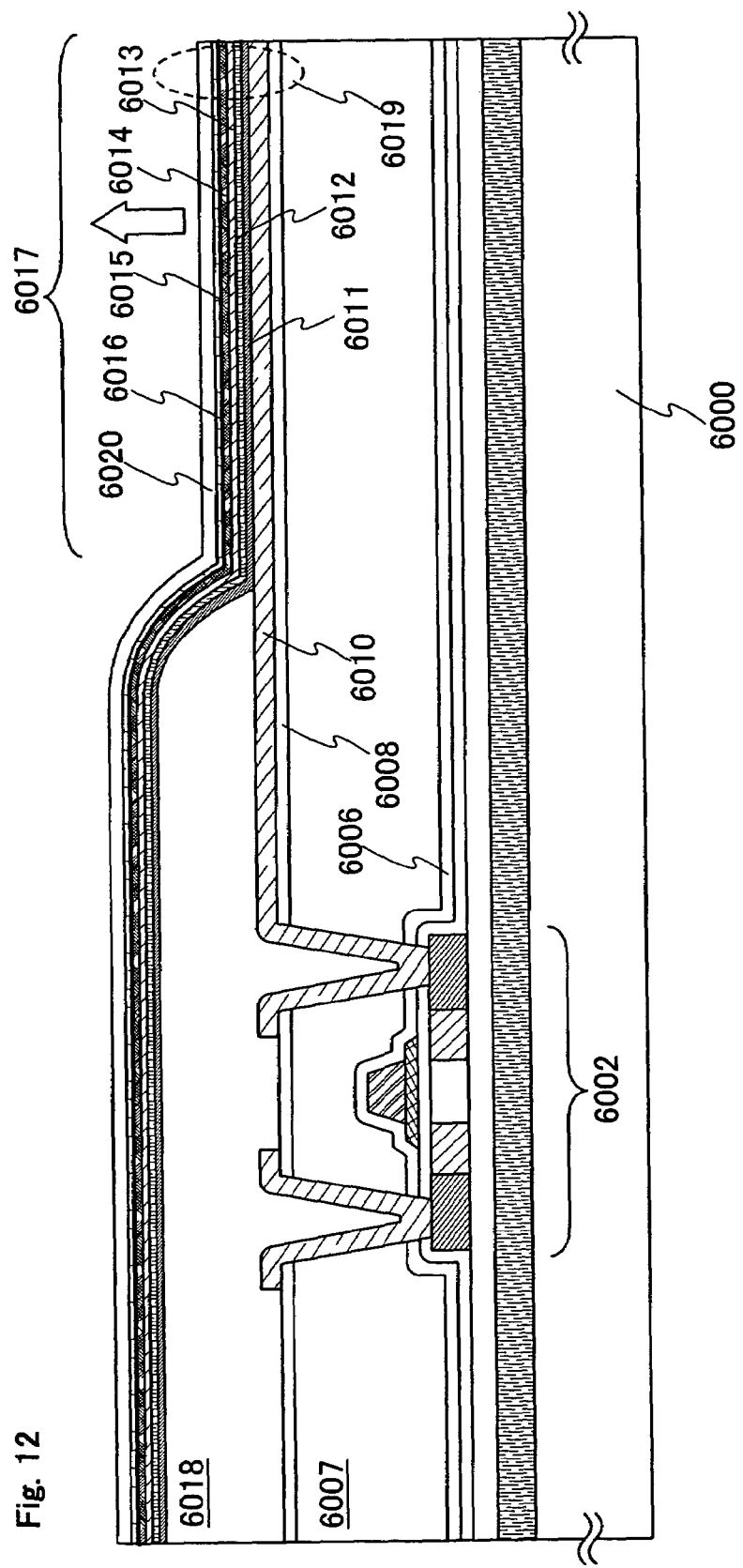
FIG. 12 is a cross-sectional view of a light emitting device.

In FIG. 12, a base film 6001 is formed over a card substrate 6000. A transistor 6002 is formed over the base film 6001. The transistor 6002 is covered with a first interlayer insulating film 6006. A second interlayer insulating film 6007 and a third interlayer insulating film 6008 are laminated over the first interlayer insulating film 6006.

The first interlayer insulating film 6006 is formed by depositing a silicon oxide film, a silicon nitride film, or a silicon oxynitride film in a single layer or a laminate by plasma CVD or sputtering. A silicon oxynitride film in which mole fraction of oxygen is higher than that of nitrogen is laminated over a silicon nitride oxide film in which mole fraction of nitrogen is higher than that of oxygen to form a film. The film may be used as the first interlayer insulating film 6006.

A heat treatment (for 1 to 12 hours at temperatures from 300° C. to 550° C.) is performed after the first interlayer insulating film 6006 is formed. As a result, a dangling bond of a semiconductor contained in an active layer 6003 can be terminated (hydrogenated) by hydrogen contained in the first interlayer insulating film 6006.

An organic resin, an inorganic insulating film, an insulating film including Si—O bond and Si—CHx bond that are formed by using a siloxane material as a start material, or the like can be used as the second interlayer insulating film 6007. A nonphotosensitive acrylic resin is used in this embodiment. A film that prevents more a substance such as moisture or oxygen that is a cause of deterioration of a light emitting element from penetrating than other insulating films is used for a third interlayer insulating film 6008. Typically, a DLC (diamond like carbon) film, a carbon nitride film, a silicon nitride film formed by RF sputtering, or the like may preferably used.

CuPc of 20 nm thick as a hole injection layer 6011, α-NPD of 40 nm thick as a hole transporting layer 6012, Alq$_3$ of 37.5 nm thick added with DMQd as a light emitting layer 6013, Alq$_3$ of 37.5 nm thick as an electron transporting layer 6014, CaF$_2$ of 1 nm thick as an electron injection layer 6015, and Al of from 10 nm to 30 nm thick as a cathode 6016 are laminated sequentially over an anode 6010 formed from TiN in FIG. 12. In FIG. 12, a lightproof material is used for the anode 6010 and the cathode 6016 has a thickness of from 10 nm to 30 nm to transmit light, thereby obtaining light emitted from the light emitting element in the side of the cathode 6016. An ITO having a lower work function due to addition of Li may be used so that the light can be emitted from the side of the cathode 6016, in addition to the method for making a film thickness smaller. This embodiment shows an example of a light emitting element for emitting light from the side of the cathode.

The transistor 6002 is a driving transistor for controlling a current supplied to the light emitting element, and is directly connected to the light emitting element or be connected in series with the light emitting element via another circuit element.

The anode 6010 is formed on the third interlayer insulating film 6008. An organic resin film 6018 is formed as a partition wall over the third interlayer insulating film 6008. It is noted that in this embodiment, the organic resin film is used as the partition wall, but an inorganic insulating film, an insulating film including Si—CHx bond and Si—O bond are formed by using a siloxane material as a starting material or the like may be also used for the partition wall. The organic resin film 6018 has an opening portion 6017 and a light emitting element 6019 is formed by laminating the anode 6010, the hole injection layer 6011, the hole transporting layer 6012, the light emitting layer 6013, the electron transporting layer 6014, the electron injection layer 6015 and the cathode 6016 in the opening portion.

A protective film 6020 is formed over the organic resin film 6018 and the cathode 6016. As well as the third interlayer insulating film 6008, a film through which the material causing to promote deterioration of the light emitting element such as moisture and oxygen is transmitted less easily than other insulating films is used as the protective film 6020. Typically, for example, a DLC film, a carbon nitride film, silicon nitride film formed by RF sputtering or the like is preferably used. A laminate of the above-described film through which the material such as moisture and oxygen is not transmitted easily and a film through which the material such as moisture and oxygen is transmitted easily may be used as the protective film.

An end portion of the organic resin film 6018 in the opening portion 6017 are preferably allowed to have a round shape so that the electroluminescence layer formed partially overlapped with the organic resin film 6018 does not have holes in the end portion thereof. Specifically, the curvature radius of the curve line shown by the sectional surface of the organic resin film in the opening portion is preferably from 0.2 μm to 2 μm.

With the above structure, the coverage of the electroluminescence layer including the hole injection layer 6011, the hole transporting layer 6012, the light emitting layer 6013, the electron transporting layer 6014, and the electron injection layer 6015, and the cathode 6016 that are formed later can be enhanced. Thus, it can be prevented that the anode 6010 and the cathode 6016 short out. Moreover, by relaxing the stress of each of the above-described layers, the defect that a light emitting region decreases, which is referred to as shrink, can be reduced and the reliability can be thus enhanced.

Practically, when the device shown in FIG. 12 is completed, a protective film (a laminate film, an ultraviolet curing resin film or the like) having a good airtightness and less degasification or a transparent substrate for sealing is preferably used to package (seal) the device and not to expose the device to air. At the time, a resin is sealed therein to enhance adhesion of the substrate for sealing for the sake of preventing the substrate for sealing from peeling off in a second process for peeling-off.

FIG. 12 shows a light emitting device before a covering material is bonded. In this embodiment, light emitted from the light emitting element 6019 is emitted toward the side of the covering material as an arrow shows. However, the present invention is not limited thereto. The light emitted from the light emitting element may be emitted from the side of the card substrate. In this case, images displayed in a pixel portion is seen in the side of the card substrate.

The light emitting device of the present invention is not limited to the structure shown in FIG. 12.

Embodiment 3

In this embodiment, a specific example of using an IC card of the present invention as an ATM card is described.

Figure 13:
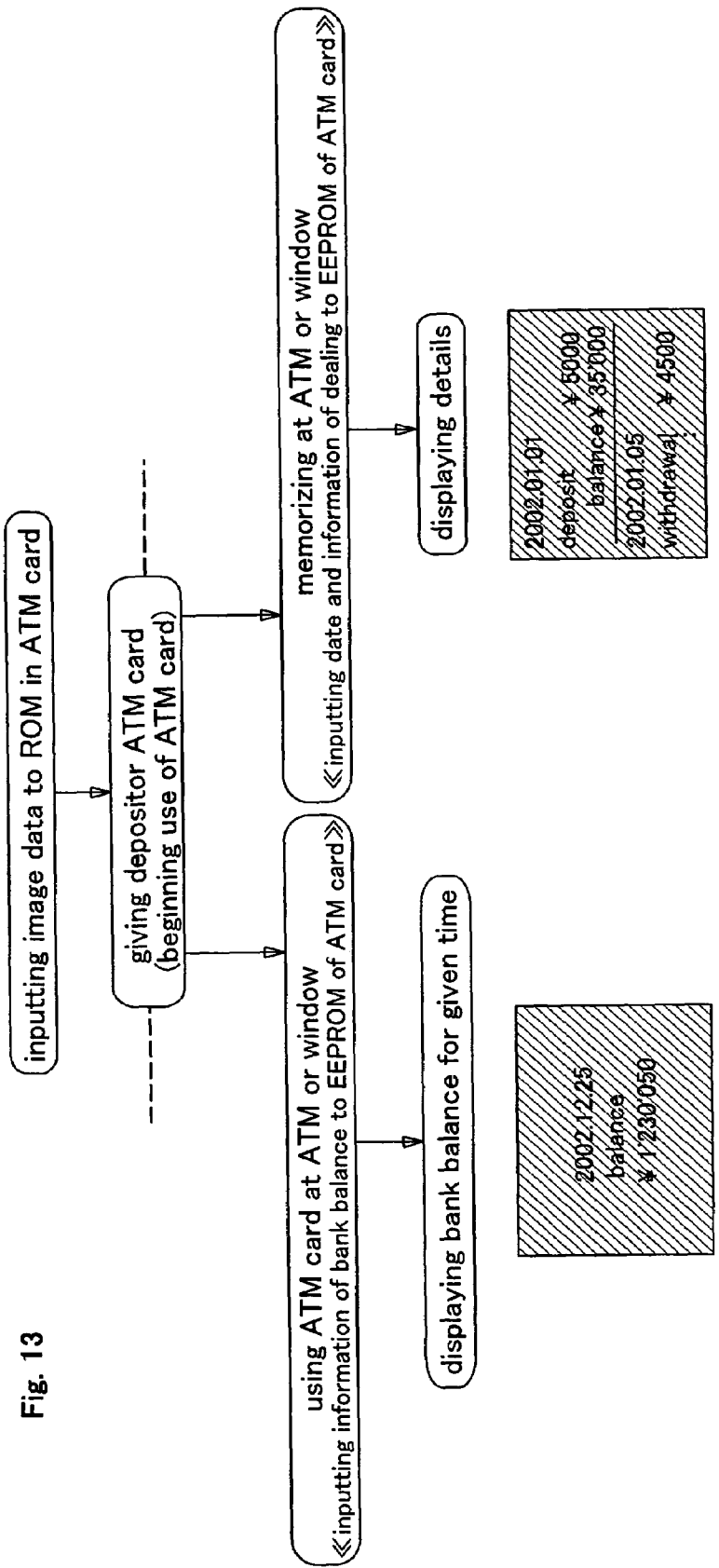
FIG. 13 shows how to use an IC card of the present invention.

As shown in FIG. 13, image data of a bank depositor's face is memorized in a ROM provided with a thin film integrated circuit of an ATM card when the bank depositor opens an account in a financial institution such as a bank. Forgery such as changing the photograph of a human face can be prevented by memorizing the data thereof in the ROM. The ATM card is given to the bank depositor, and then he/she can begin to use the ATM card.

An ATM card is used for dealings at an ATM (automated teller machine) or a window. When dealing such as drawing, depositing, or transferring cash is done, details such as bank balance or dealing date is to be memorized in an EEPROM provided with a thin film integrated circuit of an ATM card.

After the dealing, details such as bank balance or dealing date may be displayed in a pixel portion of the ATM card, and the display may be programmed to vanish after a given time. During the dealing, a payment such as an automatic draft from an account by transferring cash automatically that is performed without an ATM card may be memorized in the IC card and confirmed by displaying it in the pixel portion.

Before a payment is performed directly from an account without dealing with money using a bank ATM card like a debit card (R), information about a bank balance is got out from a host computer of a bank by using terminal equipment used in the payment, and the information of the bank balance may be displayed in the pixel portion of the IC card. When the data is displayed with the terminal equipment, there is a risk of someone's steeling a glance at it from behind. However, an IC card user can confirm the bank balance without being stolen glance at, by displaying the bank balance in the pixel portion of the IC card. Since it is possible to confirm the bank balance with terminal equipment placed in a shop, troublesome chores such as balance inquiry and account book updating at a bank window or ATM can be avoided.

An IC card of the present invention is not limited to an ATM card. The IC card of the present invention may be applied to a train pass or a prepaid card, and information about remaining balance may be displayed in a pixel portion.

Embodiment 4

In this embodiment, FIGS. 15A to 15F show photographs of a display device mounted over a plastic substrate and a CPU that is one of integrated circuits.

FIG. 15A shows a structure of a card substrate of the IC card of the present invention. Reference number 1501 denotes a display device, 1502 denotes an integrated circuit, and 1503 denotes a CPU that is one of integrated circuits.

FIG. 15B is a photograph of a display device formed over a polycarbonate substrate of 200 μm in thickness. The display device shown in FIG. 15B is a light emitting device, and the photograph is taken from the side of the polycarbonate substrate. Reference number 1504 denotes a signal line driver circuit, 1505 denotes a scanning line driver circuit, and 1506 denotes a pixel portion. FIG. 15C shows enlarged views of the pixel portion 1506 of the light emitting device shown in FIG. 15B. A light emitting element is provided with each pixels as shown in FIG. 15C. Light emitted from the light emitting element emits toward the polycarbonate substrate.

FIG. 15D shows enlarged views of wirings that are electrically connected to the display device. The wirings 1507 to 1509 are sequentially inputted with a clock bar signal, a clock signal, and a start pulse signal to be supplied to the scanning line driver circuit 1505 provided with the display device, respectively. The wirings 1507 to 1509 are formed from the same conductive film as that of a wiring for electrically connecting TFTs to one another used in the display device.

FIG. 15E shows a photograph of the CPU 1503 formed over the polycarbonate substrate of 200 μm in thickness. The photograph of the CPU 1503 shown in FIG. 15E is taken from the side of the polycarbonate substrate. FIG. 15F shows enlarged views of an arithmetic circuit included in the CPU 1503.

As described above, a flexible IC card can be formed by forming an integrated circuit and a display device over a plastic substrate.

According to the present invention, an ultrathin film integrated circuit having a total thickness of from 1 μm through 5 μm, typically, 2 μm can be formed by using a thin semiconductor film having a film thickness of 500 nm or less, although an integrated circuit formed using a silicon wafer has a thickness of about 50 μm. The thickness of a display device can be set to about 0.5 mm, preferably, about 0.02 mm. Accordingly, it is possible to provide a display device for an IC card having a thickness from 0.05 mm through 1.5 mm.

According to the present invention, a glass substrate that is less expensive and larger than a silicon wafer can be used, and thus, thin film integrated circuits can be mass-produced at low cost and with high throughput. As a result, a manufacturing cost can be reduced dramatically. Further, it is possible to use a substrate repeatedly, thereby reducing the cost on the thin film integrated circuit.

The thin film integrated circuit does not need a back-grinding process required in forming an integrated circuit formed by using a silicon wafer. The back-grinding process results in a crack or a grinding mark. Unevenness of the thickness depends on unevenness of each film making up a thin film integrated circuit in a film formation process, and thus, at most several hundred nm of unevenness can be seen. The unevenness can be suppressed as much as possible according to the present invention, as compared with the unevenness from several μm to several tens μm due to the back-grinding process.

Embodiment 5

A cross-sectional view and a structure of a light emitting element that is actually formed over a plastic substrate by transferring are described in this embodiment.

A sample observed in this embodiment is described. In this embodiment, a TFT for controlling an operation of the light emitting element is transferred over a plastic substrate containing polycarbonate. Then, a light emitting element electrically connected to the TFT is formed and a plastic substrate that is separately formed is bonded to the plastic substrate described above to sandwich the light emitting element therebetween in such a way that the both substrates are overlapped. It is noted that there is a necessity of distinguishing the plastic substrate described first from the plastic substrate bonded later. Thus, it is noted that the former is referred to as a first substrate and the latter is referred to as a second substrate. An epoxy resin is used for an adhesive used in transferring the TFT and an adhesive used in bonding the second substrate.

Figure 16:
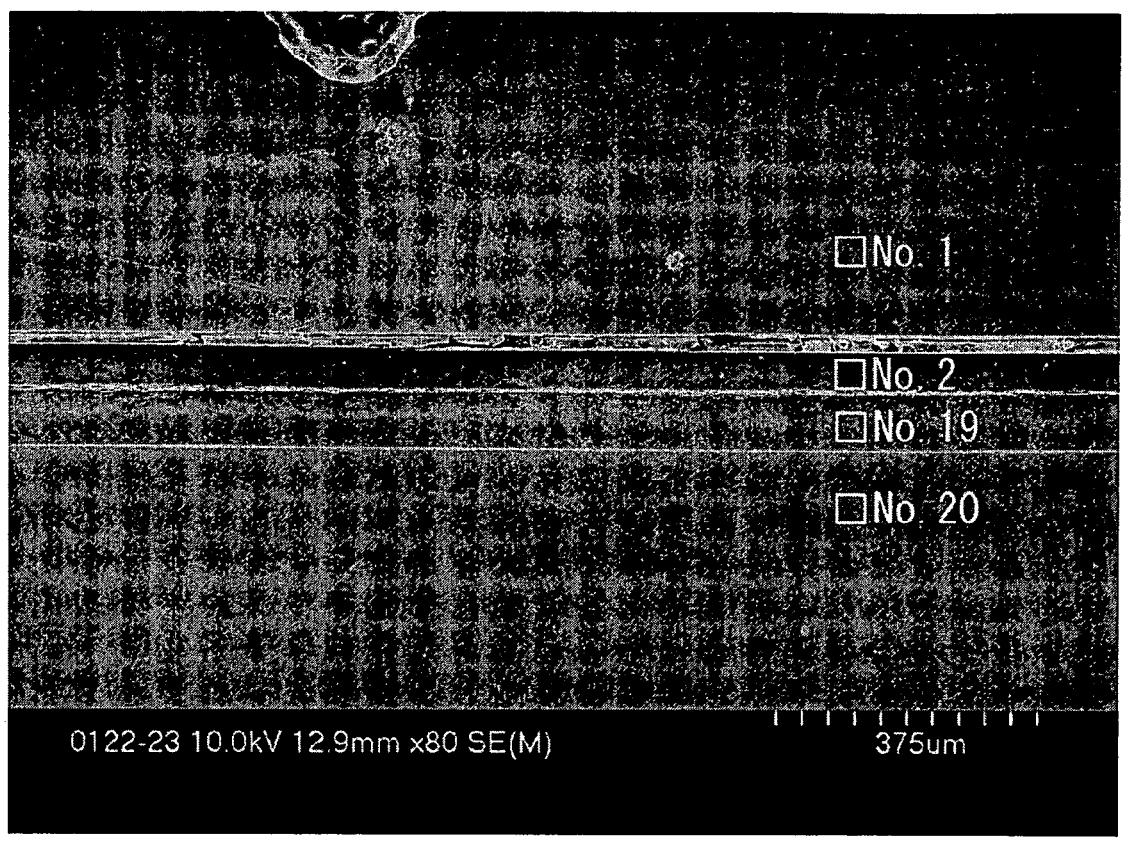
FIG. 16 is a SEM cross-sectional photograph of the sample used in Embodiment 5.

FIG. 16 is a cross-sectional photograph of a scanning electron microscope (SEM) of the sample used in this embodiment. No. 20 denotes the first plastic substrate, No. 19 denotes an adhesive, No. 2 denotes an adhesive, No. 1 denotes the second plastic substrate in FIG. 16. The TFT and the light emitting element are formed between the adhesive denoted by No. 19 and the adhesive denoted by No. 2. A layer seems to be seen between the plastic substrate denoted by No. 1 and the adhesive denoted by No. 2, but the layer corresponds to a region in which the second plastic substrate and the adhesive denoted by No. 2 are partially peeled off in grinding the cross section for measuring.

Figure 17:
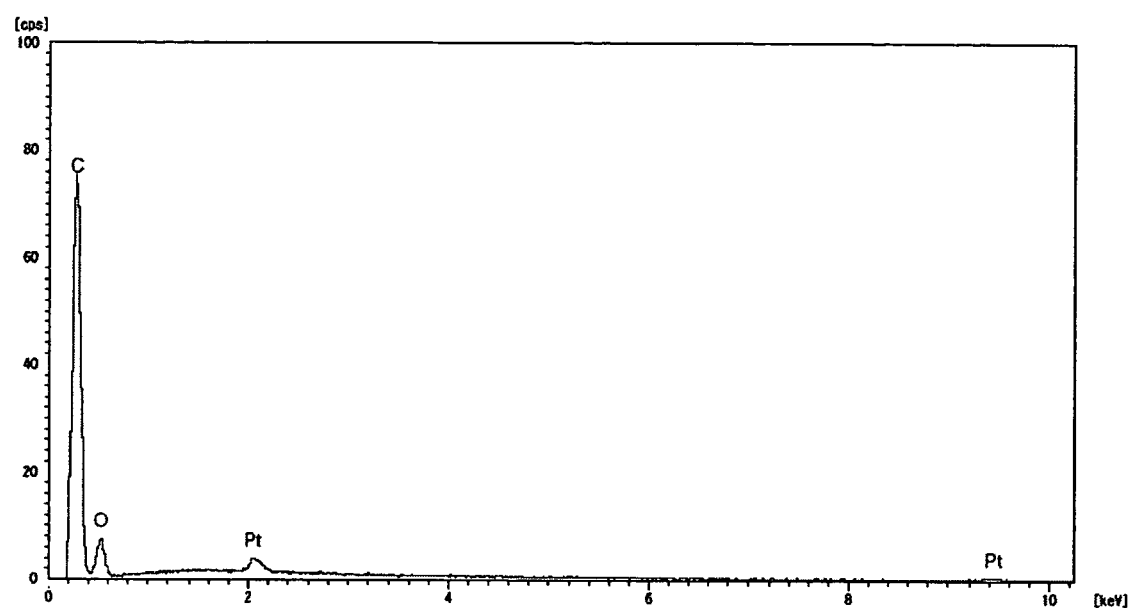
FIG. 17 shows a measured value of EDX measurement at Point 1 in FIG. 16.
Figure 20:
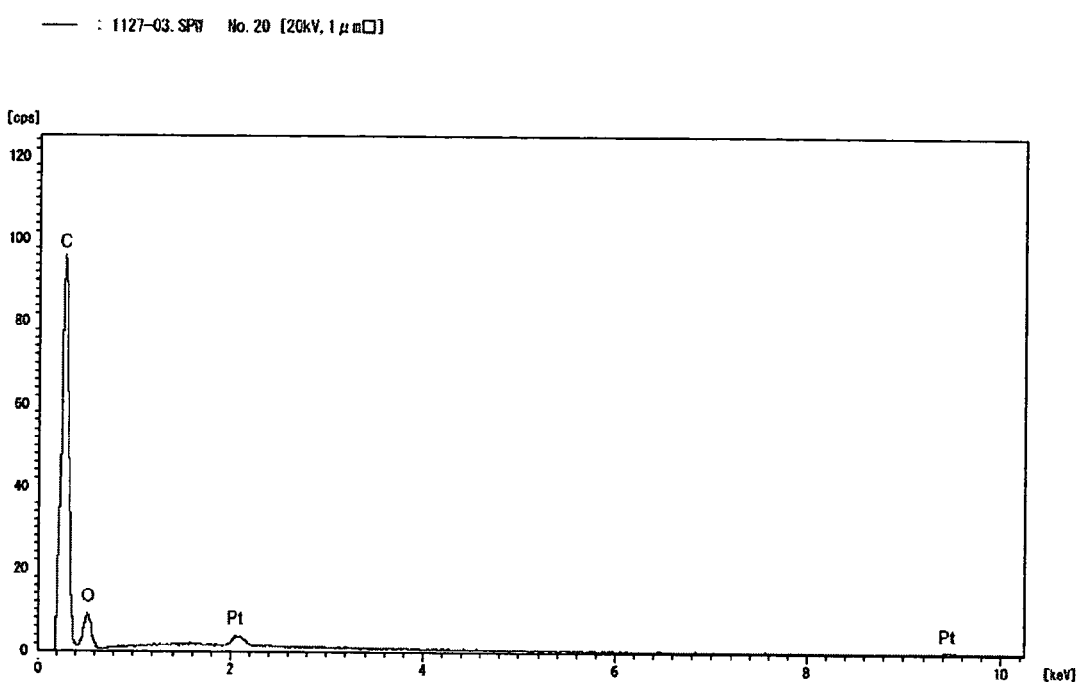
FIG. 20 shows a measured value of EDX measurement at Point 20 in FIG. 16.

FIG. 17 shows a measured value of EDX measurement that is performed to identify composition of the second substrate denoted by No.1. FIG. 20 shows a measured value of EDX measurement that is performed to identify composition of the first substrate denoted by No.20. Oxygen, and carbon that is a component of polycarbonate are detected, and further Pt that is included in a conductive film formed to prevent charging up of the sample due to an electron beam is also detected as shown in FIGS. 17 and 20.

Figure 18:
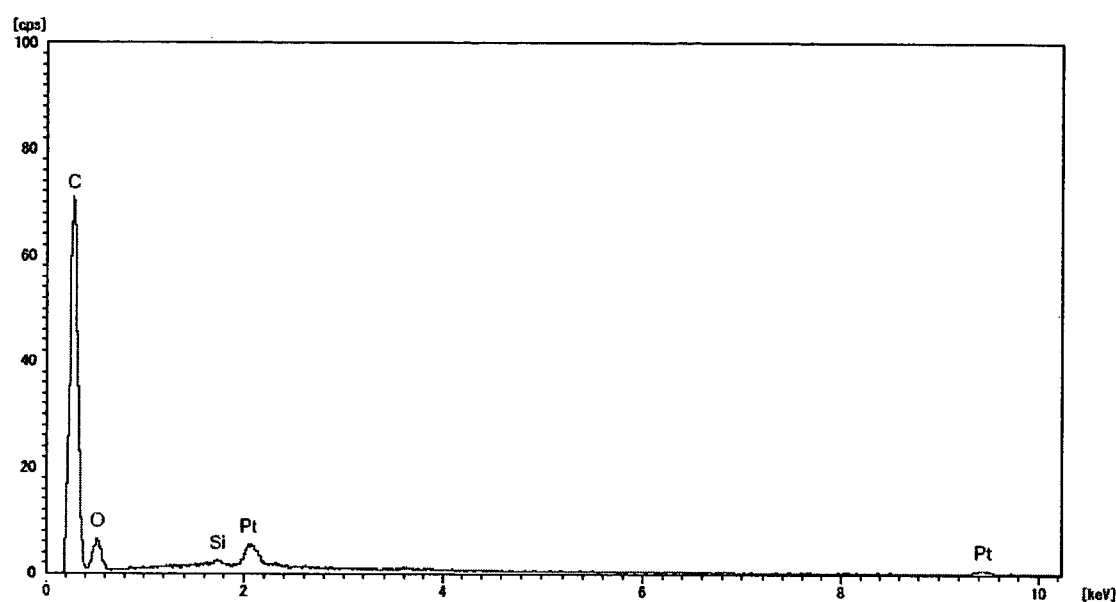
FIG. 18 shows a measured value of EDX measurement at Point 2 in FIG. 16.
Figure 19:
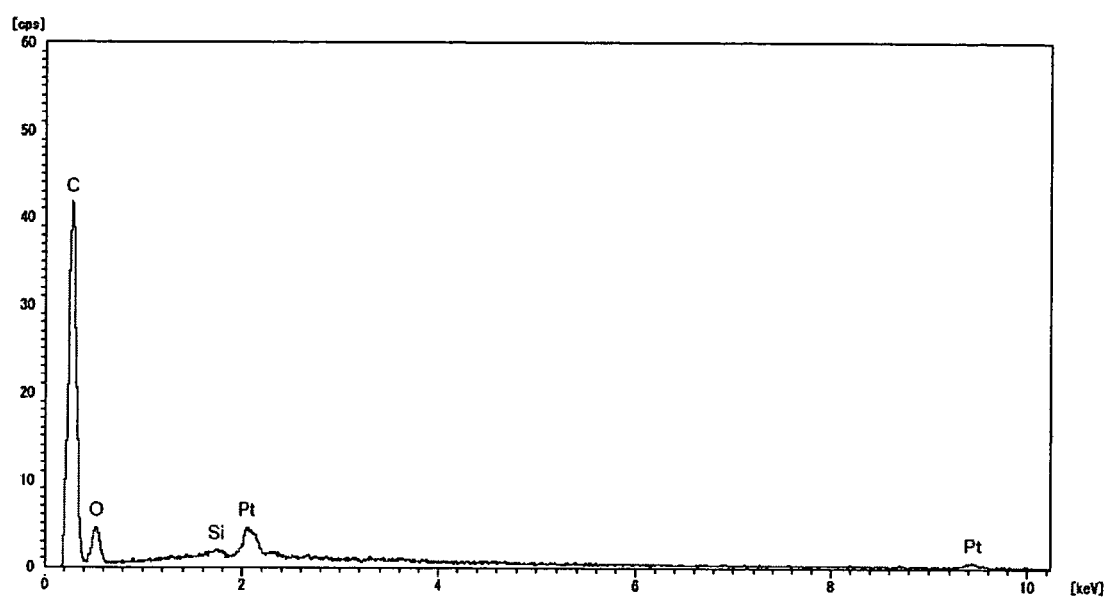
FIG. 19 shows a measured value of EDX measurement at Point 19 in FIG. 16.

Next, FIG. 18 shows a measured value of EDX measurement that is performed to identify composition of the adhesive denoted by No.2. FIG. 19 shows a measured value of EDX measurement that is performed to identify composition of the adhesive denoted by No.19. Oxygen, and carbon that is a component of the epoxy resin are detected, and further Pt that is included in a conductive film formed to prevent charging up of the sample due to an electron beam is also detected as shown in FIGS. 18 and 19.

A photograph of a transmission electron microscope (TEM) of the TFT and the light emitting element as the sample used in this embodiment is described hereinafter.

Figure 21:
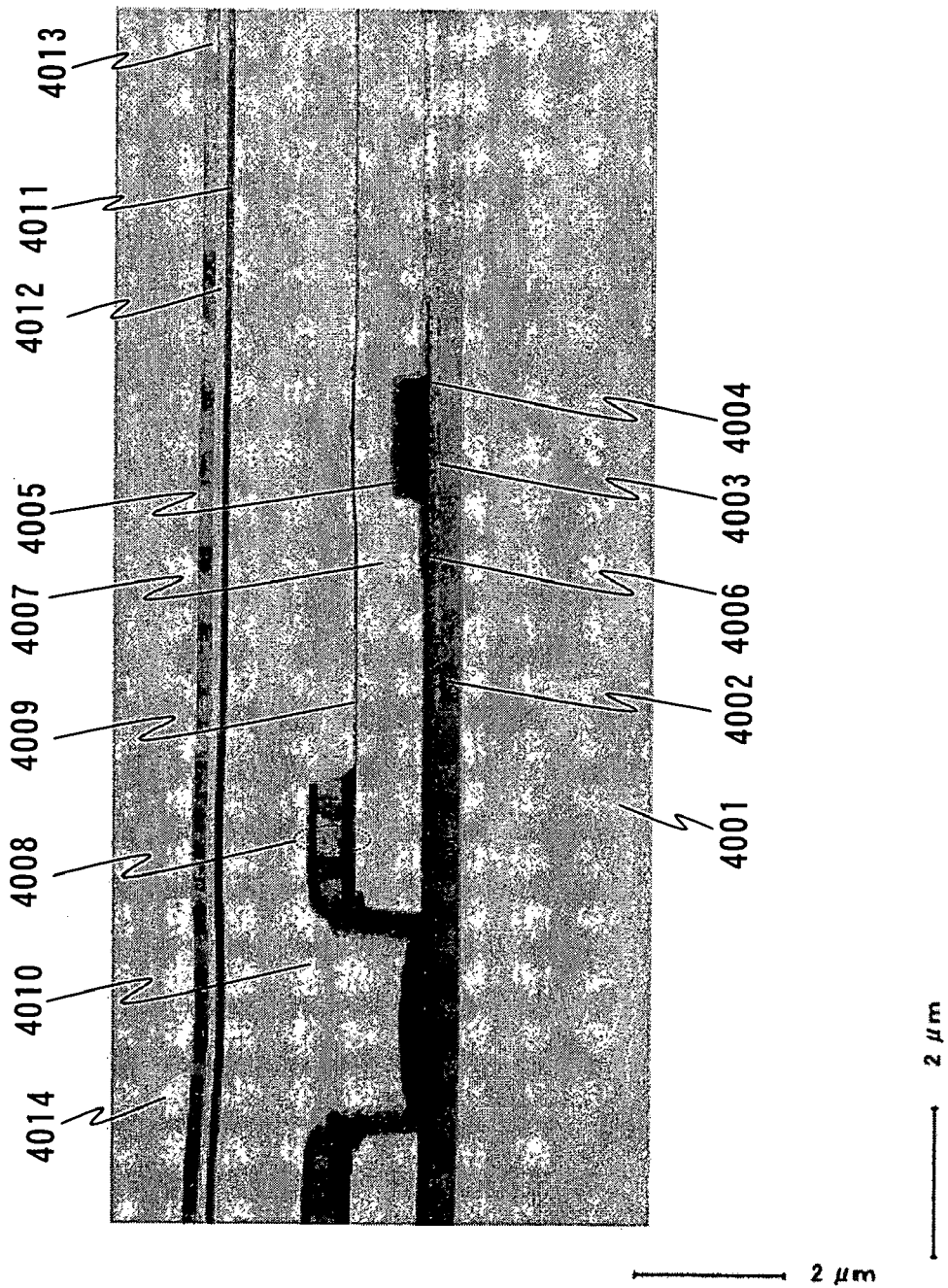
FIG. 21 is a TEM cross-sectional photograph of the sample used in Embodiment 5.

FIG. 21 shows a TEM photograph of a TFT and a wiring connected to the TFT. Reference number 4001 denotes an adhesive made from an epoxy resin, 4002 denotes a base layer in which silicon oxide and silicon nitride-oxide are laminated sequentially, 4003 denotes an island-like semiconductor included in the TFT, 4004 denotes a gate electrode containing silicon oxide, 4005 denotes a gate electrode in which TaN and W are laminated sequentially, 4007 denotes a second interlayer insulating film made from acrylic resin, 4008 denotes a wiring in which Ti, Al—Si, and Ti are laminated sequentially, 4009 denotes a third interlayer insulating film made from silicon nitride, 4010 denotes a partition wall made from an acrylic resin, 4011 denotes a silicon nitride film formed in the partition wall 4010, 4012 denotes an electroluminescence layer, 4013 denotes a cathode containing Al, and 4014 denotes an adhesive containing an epoxy resin.

Figure 22:
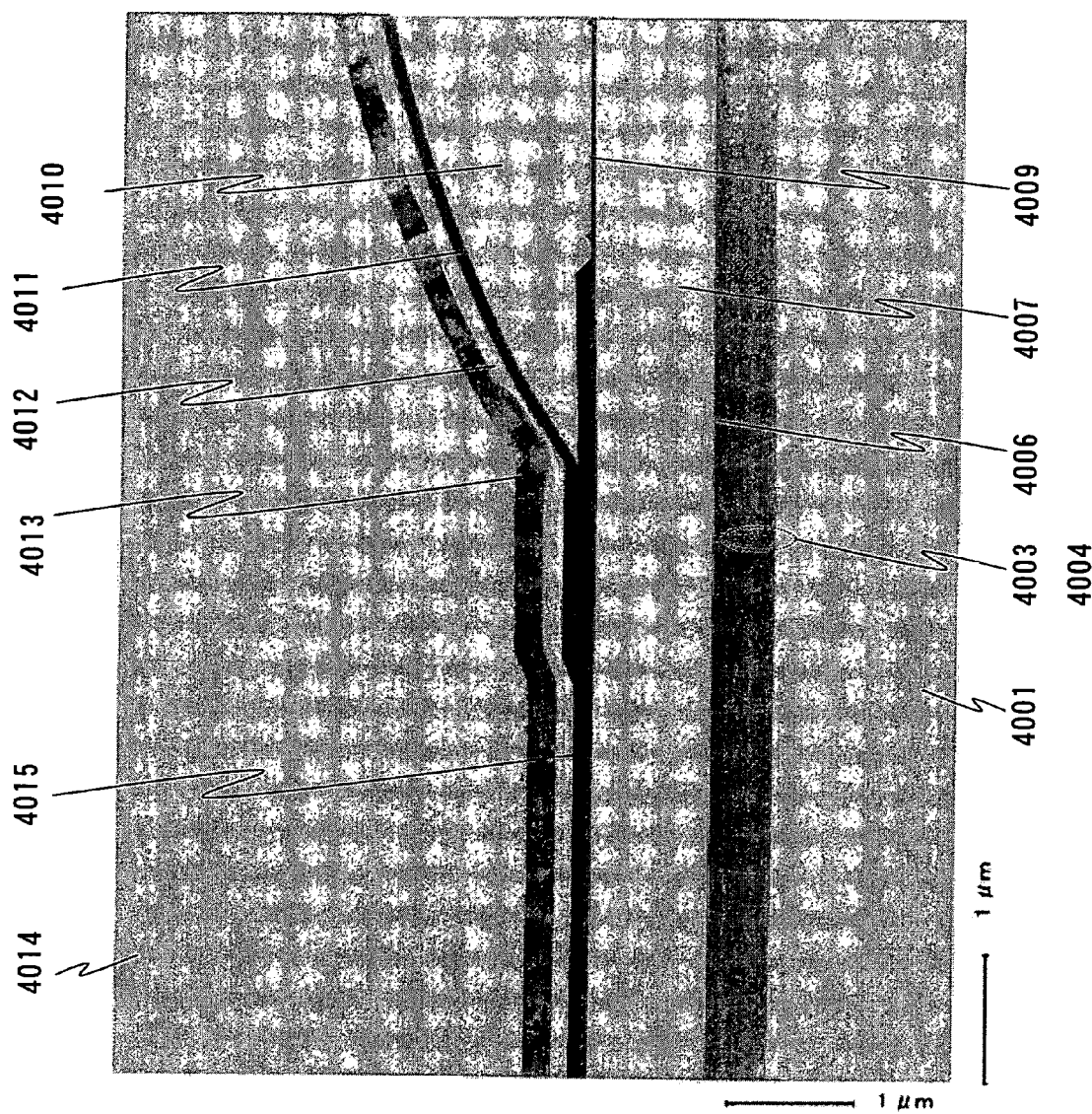
FIG. 22 is a TEM cross-sectional photograph of the sample used in Embodiment 5.

FIG. 22 shows a TEM photograph of the light emitting element. The elements which are already shown in FIG. 21 are shown by the same reference numbers. 4015 denotes an anode made of ITO. A portion in which the anode 4015, the electroluminescence layer 4012, and the cathode 4013 are overlapped corresponds to the light emitting element.

Figure 23:
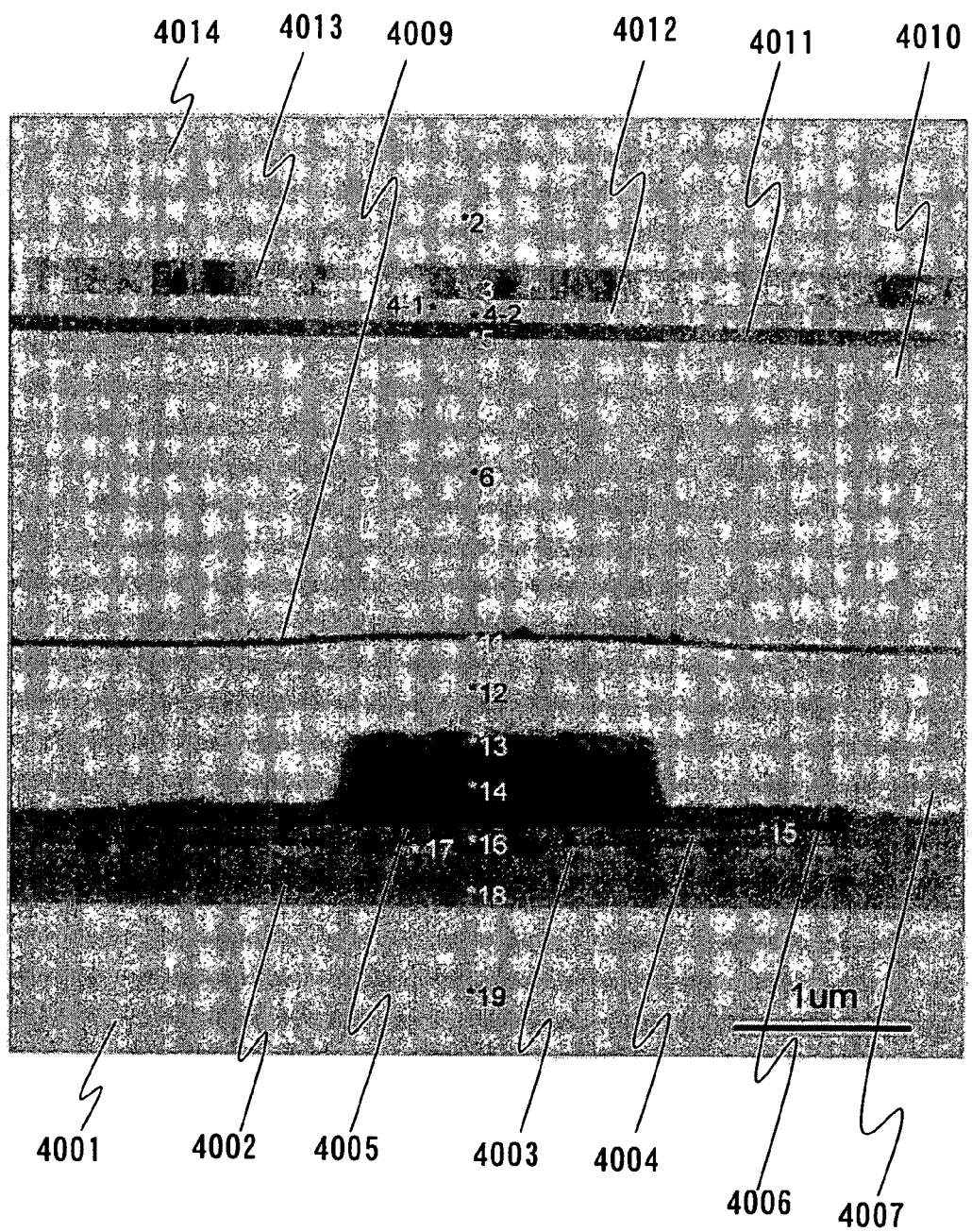
FIG. 23 is a TEM cross-sectional photograph of the sample used in Embodiment 5.

FIG. 23 shows a TEM photograph of the TFT. The elements which are already shown in FIG. 21 are shown by the same reference numbers. FIGS. 24 to 36 show measured values of EDX measurement that is performed to identify composition of each layer shown in FIG. 23. Peaks of Ga in FIGS. 24 to 36 are thought to be Ga that is used for forming a beam, when the sample is processed by a focused ion beam processing observing apparatus (FIB).

Figure 24:
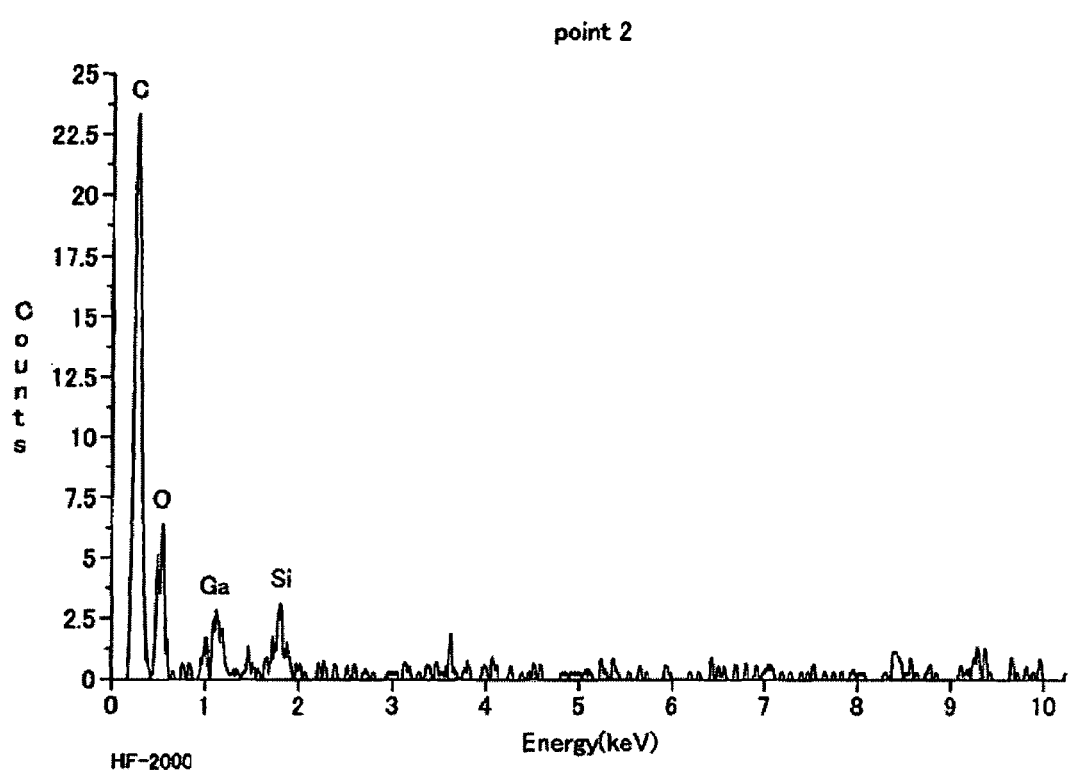
FIG. 24 shows a measured value of EDX measurement at Point 2 in FIG. 23.

FIG. 24 is a measured value of EDX measurement at Point 2 of the adhesive 4014 shown in FIG. 23. Oxygen and carbon that are composition of the epoxy resin are detected as shown in FIG. 24.

Figure 25:
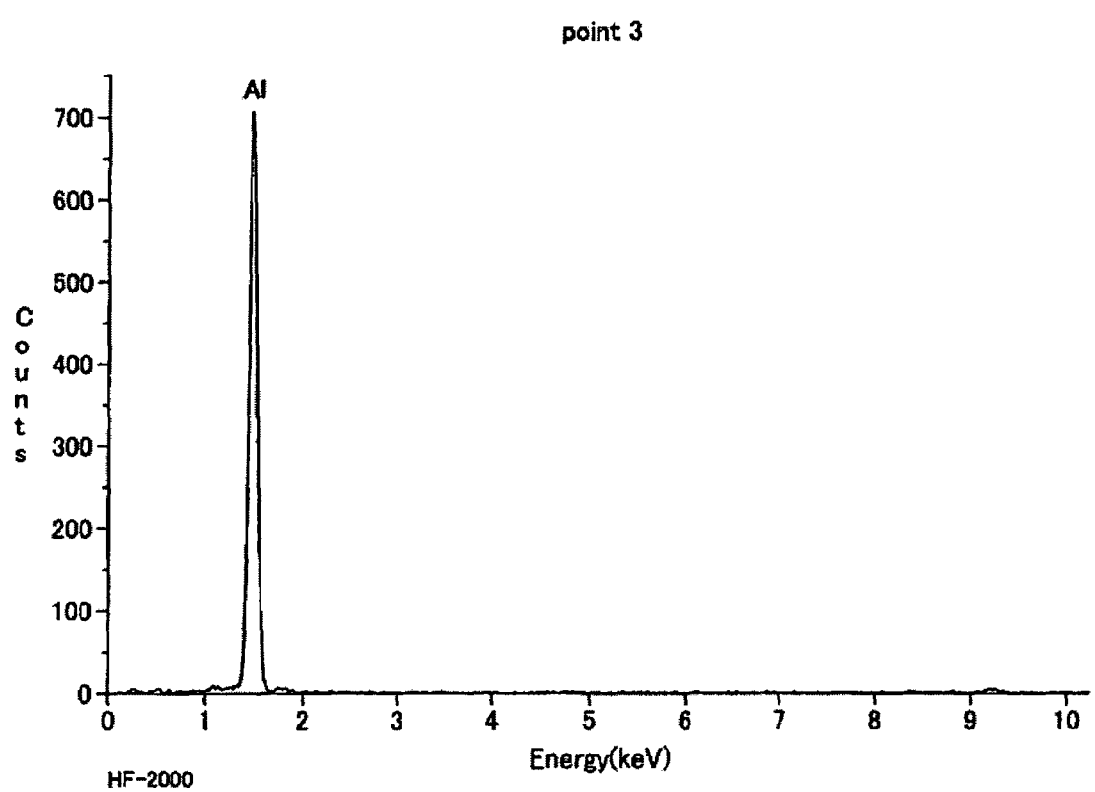
FIG. 25 shows a measured value of EDX measurement at Point 3 in FIG. 23.

FIG. 25 is a measured value of EDX measurement at Point 3 of the cathode 4013 shown in FIG. 23. Al is detected as shown in FIG. 25.

Figure 26:
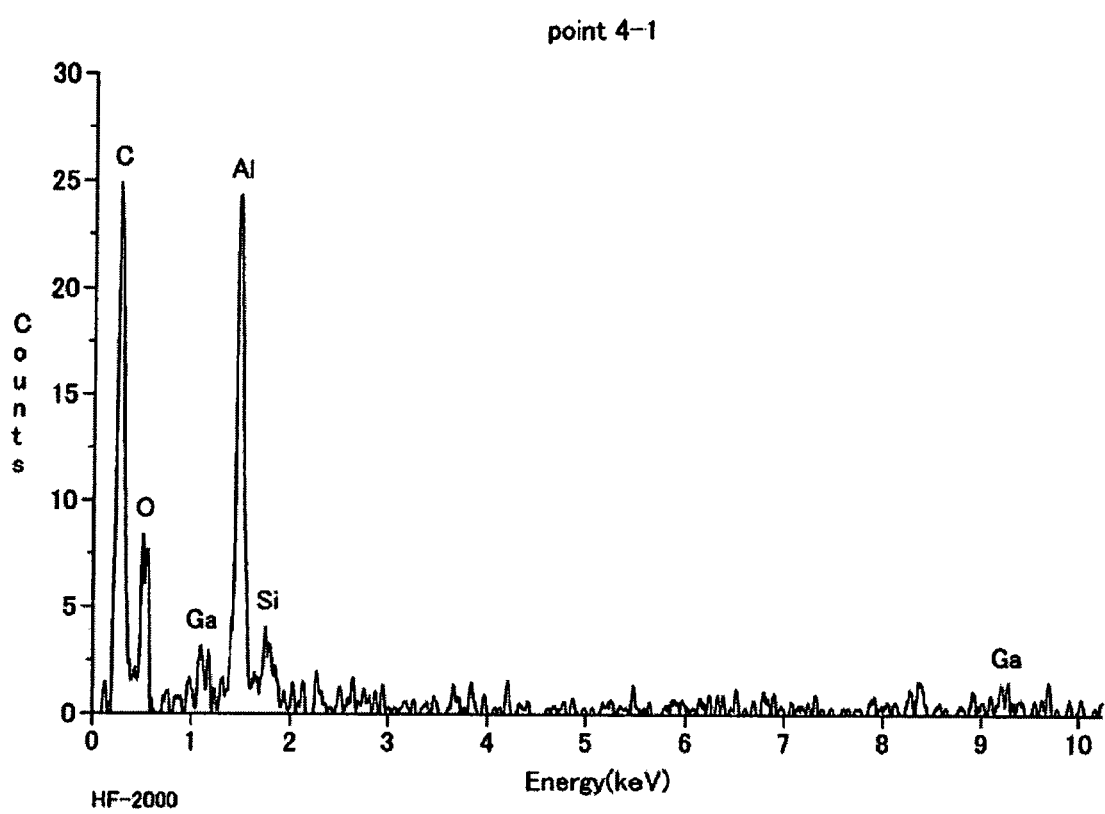
FIG. 26 shows a measured value of EDX measurement at Point 4-1 in FIG. 23.

FIG. 26 is a measured value of EDX measurement at Point 4-1 of the electroluminescence layer 4012 shown in FIG. 23. Oxygen, carbon and Al that are composition of the electroluminescence layer are detected as shown in FIG. 26.

Figure 27:
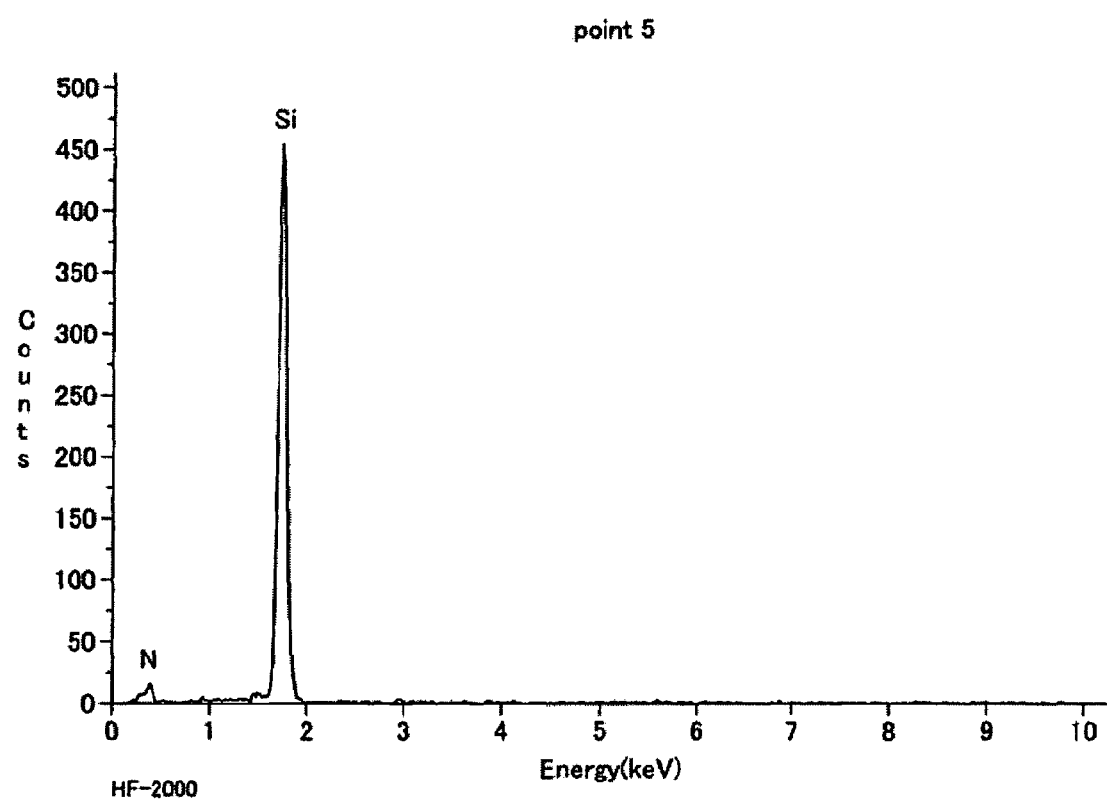
FIG. 27 shows a measured value of EDX measurement at Point 5 in FIG. 23.

FIG. 27 is a measured value of EDX measurement at Point 5 of the silicon nitride film 4011 shown in FIG. 23. Nitrogen and silicon are detected as shown in FIG. 27.

Figure 28:
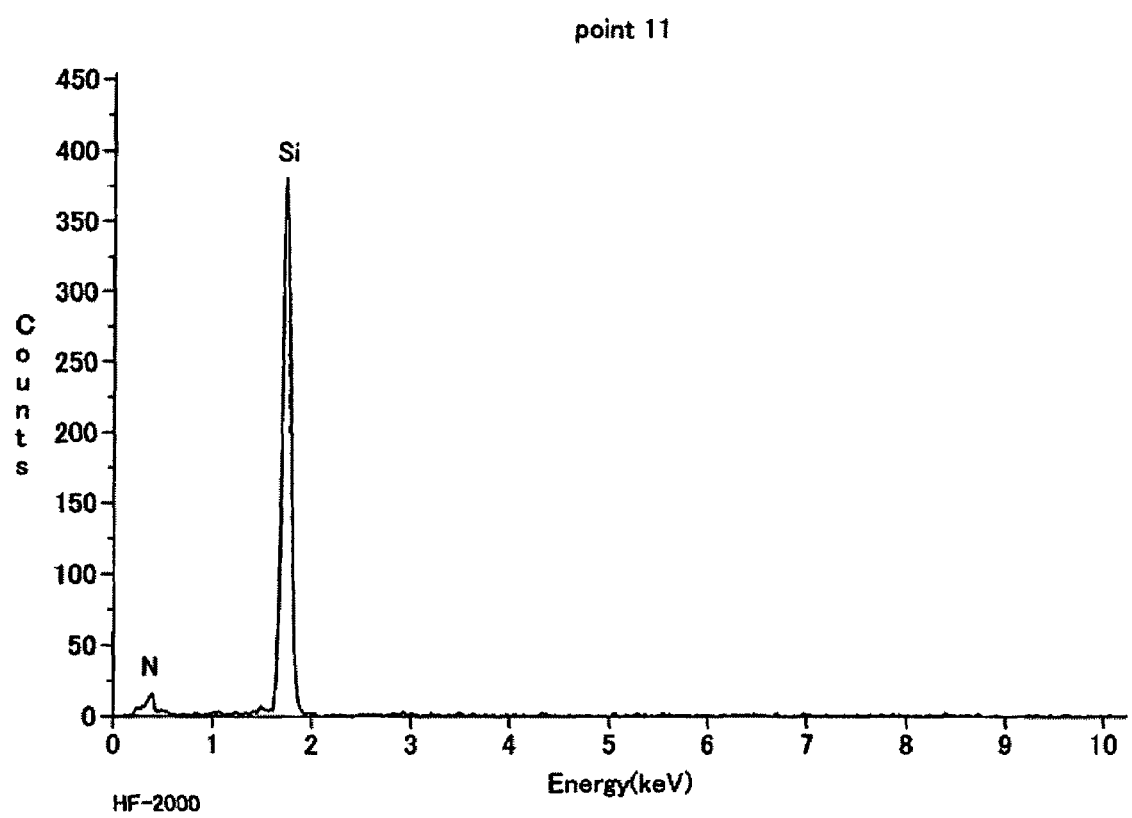
FIG. 28 shows a measured value of EDX measurement at Point 11 in FIG. 23.

FIG. 28 is a measured value of EDX measurement at Point 11 of the third interlayer insulating film 4009 shown in FIG. 23. Nitrogen and silicon that are composition of silicon nitride are detected as shown in FIG. 28.

Figure 29:
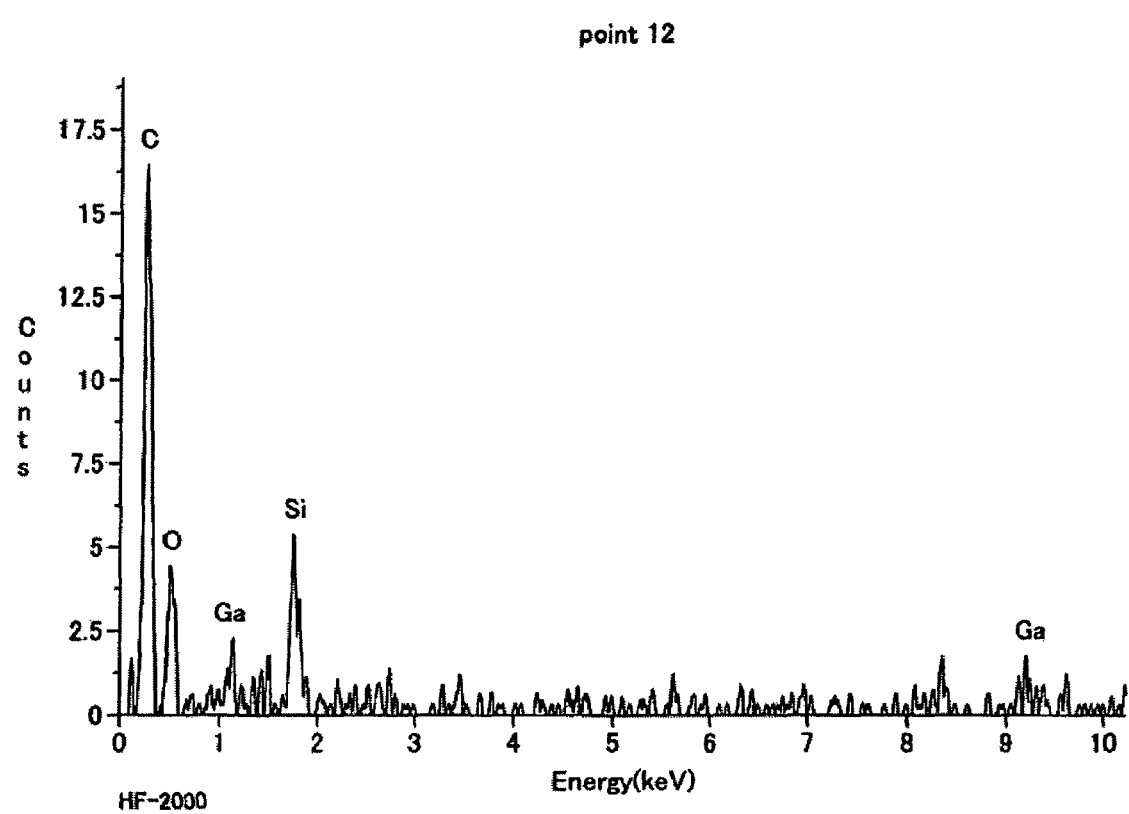
FIG. 29 shows a measured value of EDX measurement at Point 12 in FIG. 23.

FIG. 29 is a measured value of EDX measurement at Point 12 of the second interlayer insulating film 4007 shown in FIG. 23. Carbon and oxygen that are composition of acrylic resin are detected as shown in FIG. 29.

Figure 30:
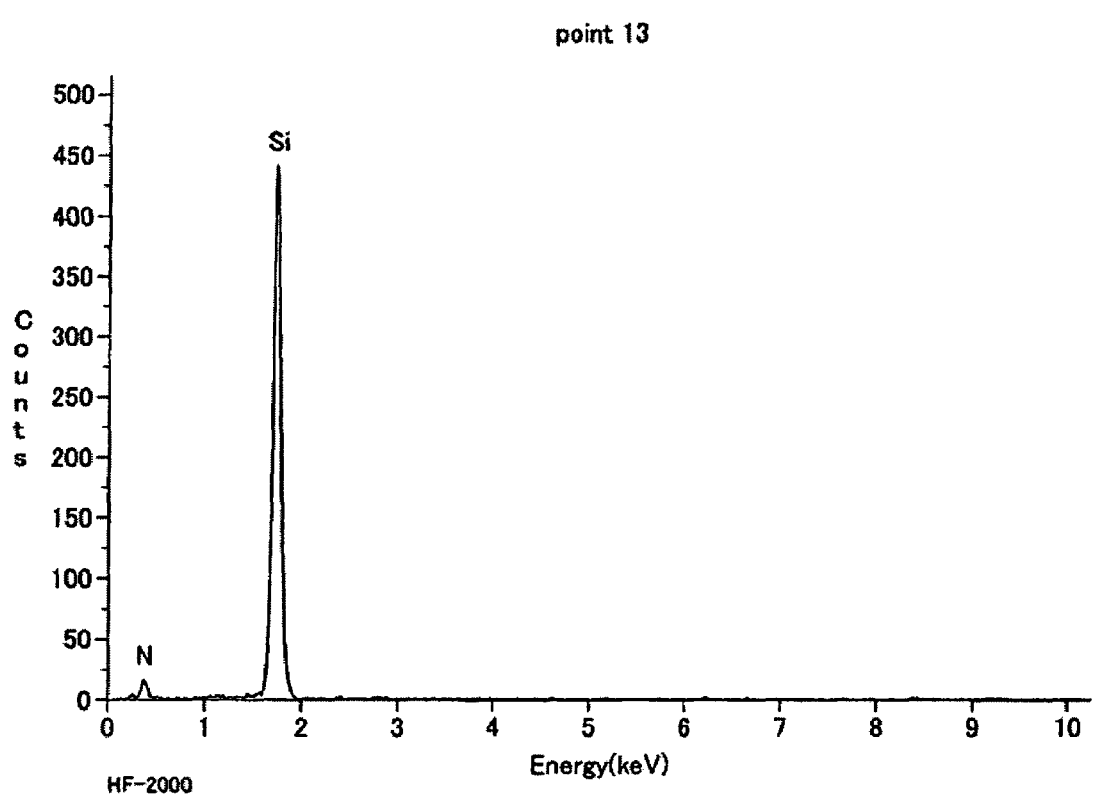
FIG. 30 shows a measured value of EDX measurement at Point 13 in FIG. 23.

FIG. 30 is a measured value of EDX measurement at Point 13 of the first interlayer insulating film 4006 shown in FIG. 23. Nitrogen and silicon that are composition of silicon nitride are detected as shown in FIG. 30.

Figure 31:
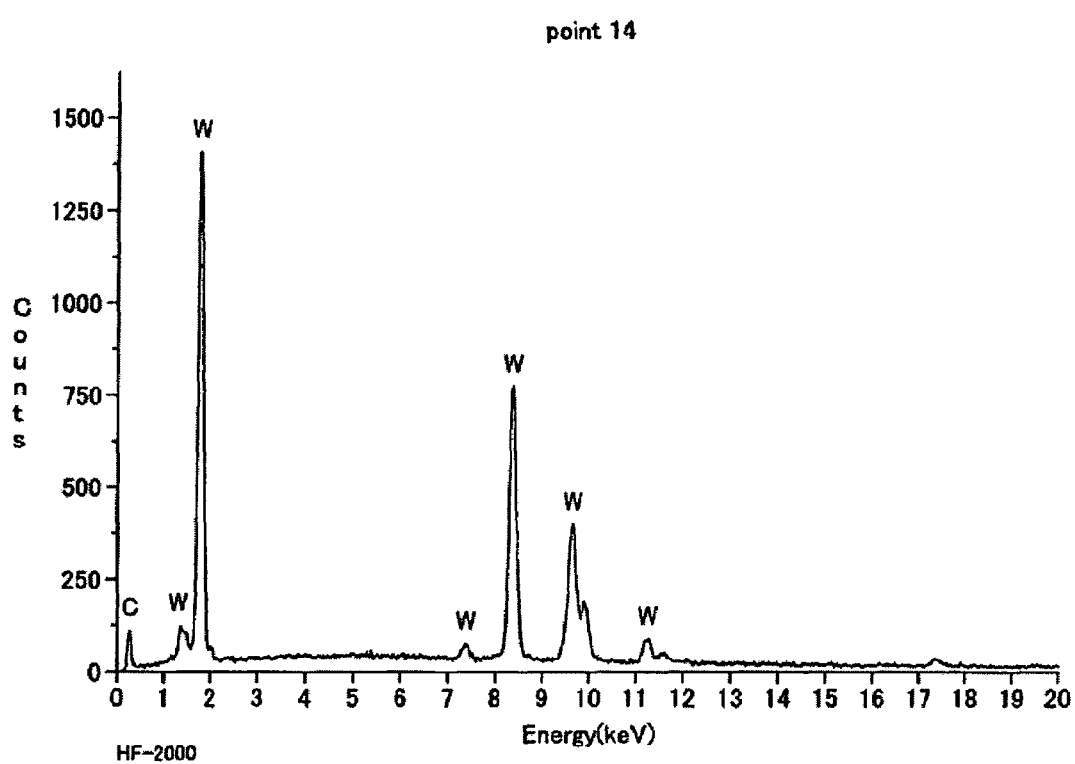
FIG. 31 shows a measured value of EDX measurement at Point 14 in FIG. 23.
Figure 32:
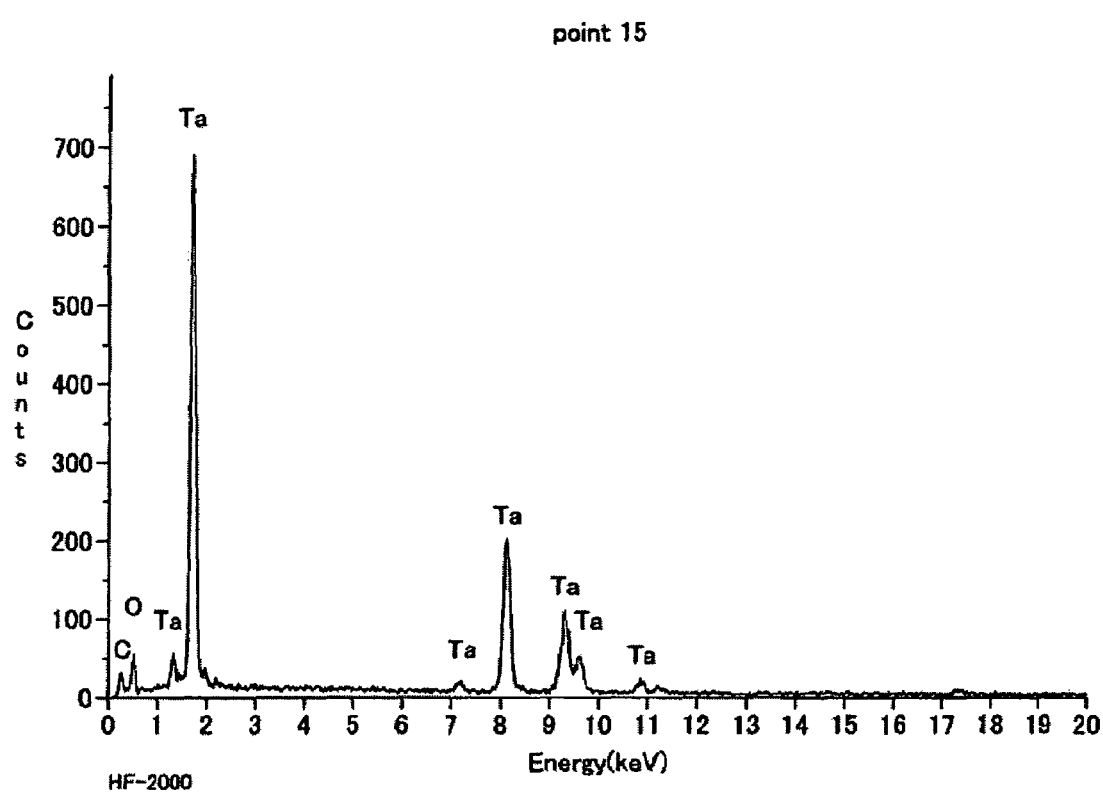
FIG. 32 shows a measured value of EDX measurement at Point 15 in FIG. 23.

FIG. 31 is a measured value of EDX measurement at Point 14 of the gate electrode 4005 shown in FIG. 23. FIG. 32 is a measured value of EDX measurement at Point 15 of the gate electrode 4005 shown in FIG. 23. W is detected at the Point 14 of the gate electrode 4005 as shown in FIG. 31 and Ta is detected at the Point 15 of the gate electrode 4005 as shown in FIG. 32.

Figure 33:
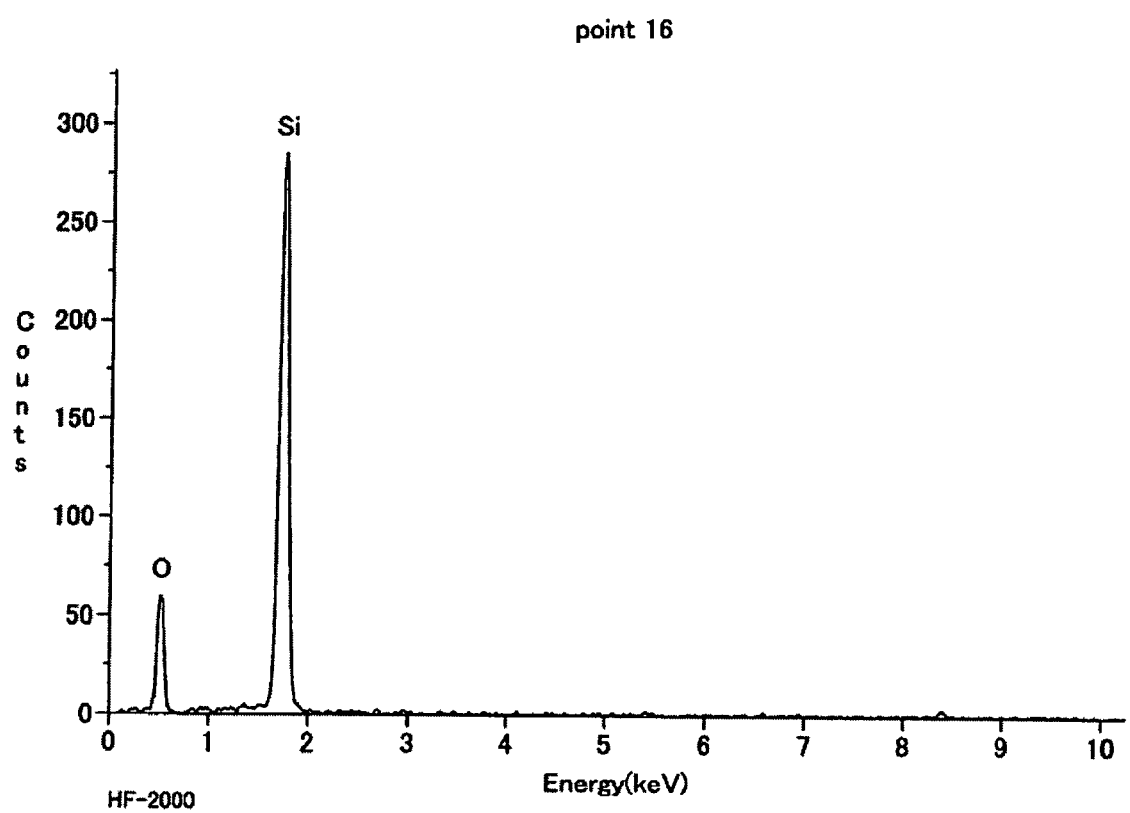
FIG. 33 shows a measured value of EDX measurement at Point 16 in FIG. 23.

FIG. 33 is a measured value of EDX measurement at Point 16 of the gate insulating film 4004 shown in FIG. 23. Oxygen and silicon that are composition of silicon oxide are detected as shown in FIG. 33.

Figure 34:
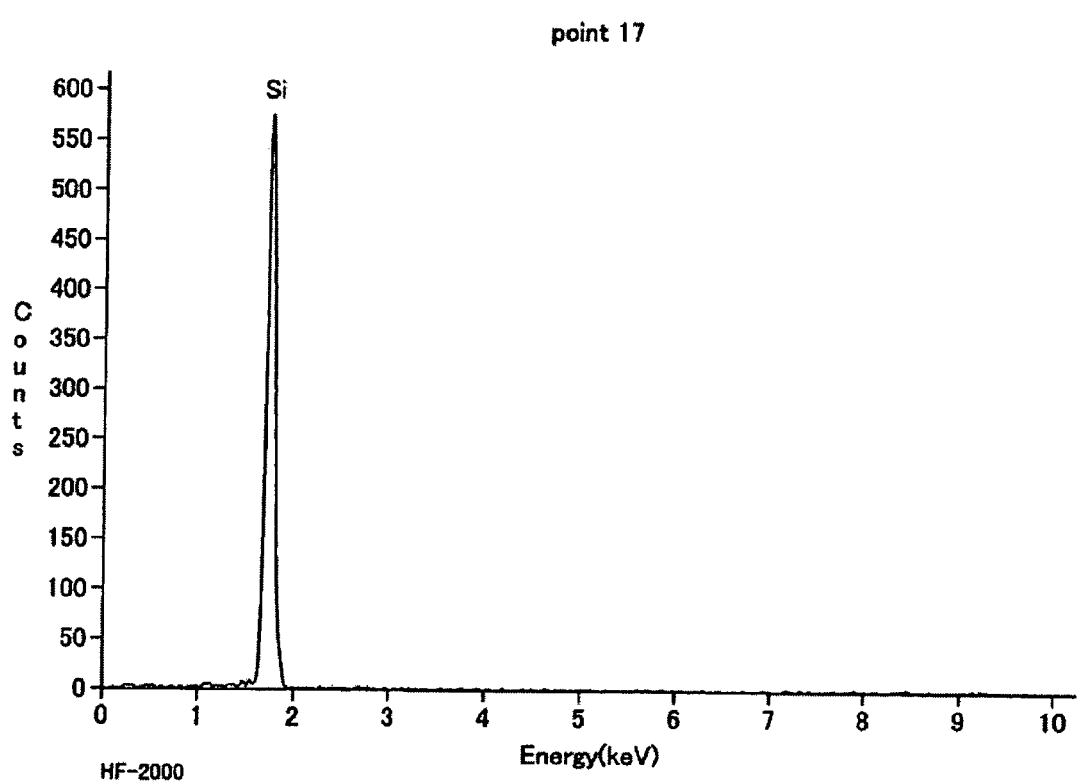
FIG. 34 shows a measured value of EDX measurement at Point 17 in FIG. 23.

FIG. 34 is a measured value of EDX measurement at Point 17 of the island-like semiconductor film 4003 shown in FIG. 23. Silicon is detected as shown in FIG. 34.

Figure 35:
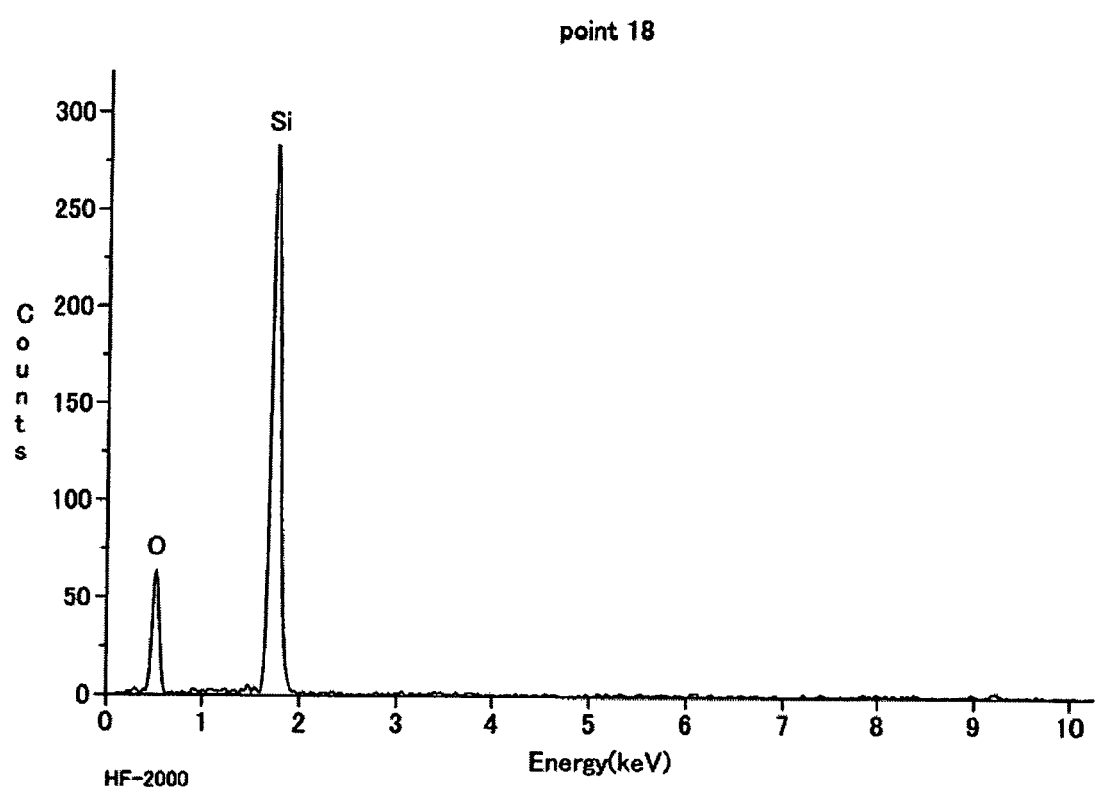
FIG. 35 shows a measured value of EDX measurement at Point 18 in FIG. 23.

FIG. 35 is a measured value of EDX measurement at Point 18 of the base film 4002 shown in FIG. 23. Oxygen and silicon that are composition of silicon oxide are detected as shown in FIG. 35. In practice, a film made of silicon nitride oxide is formed over a film made of silicon oxide to form the base film 4002.

Figure 36:
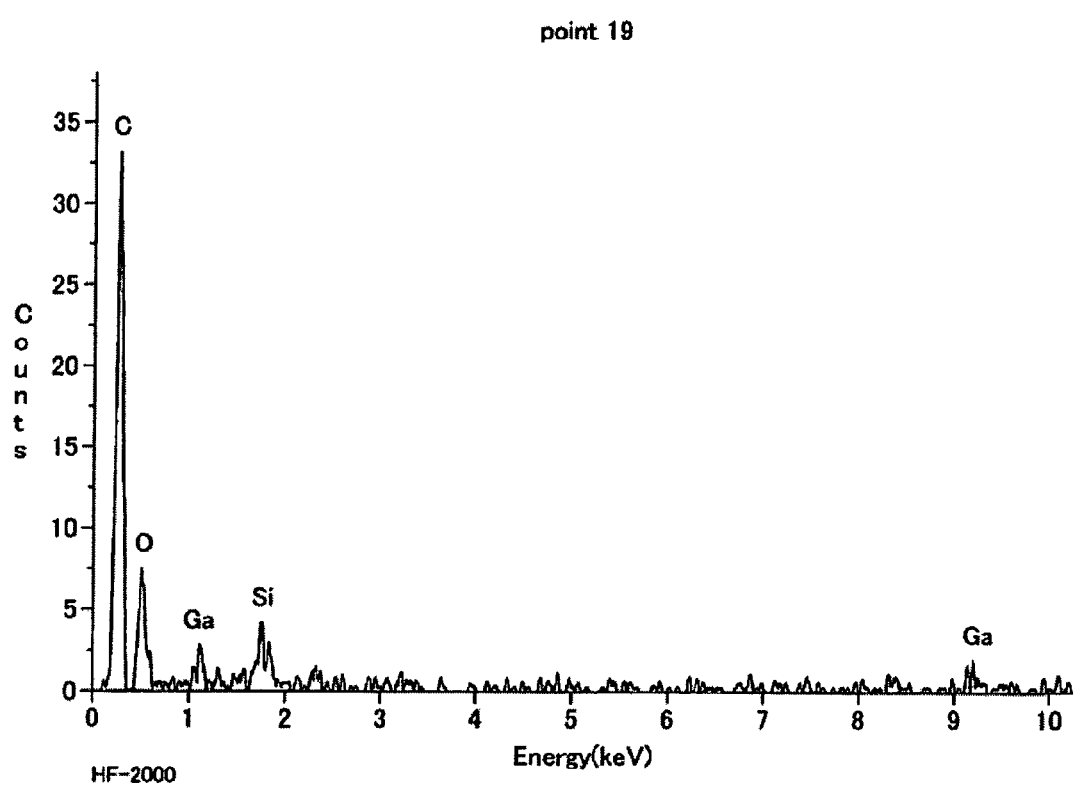
FIG. 36 shows a measured value of EDX measurement at Point 19 in FIG. 23.

FIG. 36 is a measured value of EDX measurement at Point 19 of the adhesive 4001 shown in FIG. 23. Oxygen and carbon that are composition of the epoxy resin are detected as shown in FIG. 36.

What is claimed is:

1. A card comprising:
a display device comprising a first semiconductor element comprising a first polycrystalline semiconductor film;
a first thin film integrated circuit comprising a second semiconductor element comprising a second polycrystalline semiconductor film;
a first substrate; and
a second substrate,
wherein the display device is electrically connected to the first thin film integrated circuit,
wherein the first thin film integrated circuit and the display device are covered and sealed with a resin between the first substrate and the second substrate of the card,
wherein the resin is in contact with the second substrate; and
wherein the first substrate and the second substrate comprise a plastic material.

2. A card according to claim 1, wherein the card has a thickness from 0.05 mm through 1.5 mm.

3. A card according to claim 1, wherein the display device is a passive matrix type display device.

4. A card according to claim 1, wherein the display device is an active matrix type display device.

5. A card according to claim 1, further comprising:
a second thin film integrated circuit,
wherein the first and second thin film integrated circuits are laminated.

6. A card according to claim 1, wherein the display device is a liquid crystal display device.

7. A card according to claim 1, wherein the display device is a light emitting device.

8. A card according to claim 1, wherein the card is an ID card.

9. A card according to claim 1, wherein the card is a semi-hard card.

10. A card according to claim 1, wherein the card is an IC card.

11. A card comprising:
a first substrate comprising a plastic material;
a display device comprising a first semiconductor element comprising a first polycrystalline semiconductor film over the first substrate;
a first thin film integrated circuit comprising a second semiconductor element comprising a second polycrystalline semiconductor film over the first substrate;
a resin over the display device and the first thin film integrated circuit; and
a second substrate comprising a plastic material over the resin,
wherein the resin is in contact with the second substrate.

12. A card according to claim 5, further comprising an insulating film,
wherein the display device and one of the first and second thin film integrated circuits are in contact with the insulating film.

13. A card according to claim 1, further comprising:
an antenna; and
an insulating film,
wherein the display device, the first thin film integrated circuit and the antenna are in contact with the insulating film.

14. A card according to claim 1, wherein the display device comprises a third substrate.

15. A card according to claim 11, further comprising a second thin film integrated circuit comprising a third semiconductor element comprising a third polycrystalline semiconductor film;
wherein the first and second thin film integrated circuits are laminated to each other.

16. A card according to claim 15, further comprising an insulating film,
wherein the display device and one of the first and second thin film integrated circuits are in contact with the insulating film.

17. A card according to claim 11, further comprising:
an antenna; and
an insulating film,
wherein the display device, the first thin film integrated circuit and the antenna are in contact with the insulating film.

18. A card according to claim 11, wherein the display device comprises a third substrate.

19. A card according to claim 1 further comprising: an adhesive below the first thin film integrated circuit and the display device, and in contact with the first substrate.

20. A card according to claim 19, wherein the adhesive is a photo-curing adhesive or a light curing adhesive.

21. A card according to claim 19, wherein the adhesive includes a powder comprising one of silver, nickel, aluminum, and aluminum nitride or a filler.

22. A card according to claim 11 further comprising: an adhesive below the first thin film integrated circuit and the display device, and in contact with the first substrate.

23. A card according to claim 22, wherein the adhesive is a photo-curing adhesive or a light curing adhesive.

24. A card according to claim 22, wherein the adhesive includes a powder comprising one of silver, nickel, aluminum, and aluminum nitride or a filler.

25. A booking-account system using a card comprising:
a display device comprising a first semiconductor element comprising a first polycrystalline semiconductor film; and
a first thin film integrated circuit comprising a second semiconductor element comprising a second polycrystalline semiconductor film;
wherein the first thin film integrated circuit and the display device are covered and sealed with a resin between a first substrate and a second substrate, the resin being in contact with the second substrate,
wherein the display device is electrically connected to the first thin film integrated circuit and driving of the display device is controlled by the first thin film integrated circuit, and
wherein information is memorized in the first thin film integrated circuit and displayed by the display device.

26. A booking-account system using a card according to claim 25, wherein the information is an account balance, amount of money of a transaction, a date, or an image of an owner of the card.

27. A booking-account system using a card according to claim 25, wherein the first substrate and the second substrate comprise a plastic material.

28. A booking-account system using a card according to claim 25, further comprising:
a second thin film integrated circuit, wherein the first and second thin film integrated circuits are laminated.

29. A booking-account system using a card according to claim 25, further comprising an insulating film, wherein the display device and the first thin film integrated circuit are in contact with the insulating film.

30. A booking-account system using a card according to claim 25, further comprising:
an antenna; and
an insulating film,
wherein the display device, the first thin film integrated circuit and the antenna are in contact with the insulating film.

31. A booking-account system using a card according to claim 25, wherein the display device comprises a third substrate.

32. A booking-account system using a card according to claim 25, further comprising a second thin film integrated circuit comprising a third semiconductor element comprising a third polycrystalline semiconductor film;
wherein the first and second thin film integrated circuits are laminated to each other.

33. A booking-account system using a card according to claim 25, further comprising an insulating film, wherein the display device and one of the first and second thin film integrated circuits are in contact with the insulating film.

34. A booking-account system using a card according to claim 25, further comprising an adhesive below the first thin film integrated circuit and the display device, and in contact with the first substrate.

35. A booking-account system using a card according to claim 34, wherein the adhesive is a photo-curing adhesive or a light curing adhesive.

36. A booking-account system using a card according to claim 34, wherein the adhesive includes a powder comprising one of silver, nickel, aluminum, and aluminum nitride or a filler.

37. A booking-account system using a card according to claim 25, wherein the card has a thickness from 0.05 mm through 1.5 mm.

38. A booking-account system using a card according to claim 25, wherein the display device is a passive matrix type display device.

39. A booking-account system using a card according to claim 25, wherein the display device is an active matrix type display device.

40. A booking-account system using a card according to claim 25, wherein the display device is a liquid crystal display device.

41. A booking-account system using a card according to claim 25, wherein the display device is a light emitting device.

42. A booking-account system using a card according to claim 25, wherein the card is an IC card including an ATM card, train pass, or a prepaid card.

43. A booking-account system using a card according to claim 25, wherein the card is an ID card.

44. A booking-account system using a card according to claim 25, wherein the card is a semi-hard card.

45. A booking-account system using a card comprising:
a first substrate comprising a plastic material;
a display device comprising a first semiconductor element comprising a first polycrystalline semiconductor film over the first substrate;
a first thin film integrated circuit comprising a second semiconductor element comprising a second polycrystalline semiconductor film over the first substrate;
a resin over the display device and the first thin film integrated circuit; and
a second substrate comprising a plastic material over the resin, the resin being in contact with the second substrate,
wherein information is memorized in the first thin film integrated circuit and displayed by the display device.

46. A booking-account system using a card according to claim 45, wherein the information is an account balance, amount of money of a transaction, a date, or an image of an owner of the card.

47. A booking-account system using a card according to claim 45, further comprising:
a second thin film integrated circuit,
wherein the first and second thin film integrated circuits are laminated, 48. A booking-account system using a card according to claim 45, further comprising an insulating film, wherein the display device and the first thin film integrated circuit are in contact with the insulating film.

49. A booking-account system using a card according to claim 45, further comprising:
an antenna; and
an insulating film,
wherein the display device, the first thin film integrated circuit and the antenna are in contact with the insulating film.

50. A booking-account system using a card according to claim 45, wherein the display device comprises a third substrate.

51. A booking-account system using a card according to claim 45, further comprising a second thin film integrated circuit comprising a third semiconductor element comprising a third polycrystalline semiconductor film;
wherein the first and second thin film integrated circuits are laminated to each other.

52. A booking-account system using a card according to claim 51, further comprising an insulating film, wherein the display device and one of the first and second thin film integrated circuits are in contact with the insulating film.

53. A booking-account system using a card according to claim 45, further comprising an adhesive below the first thin film integrated circuit and the display device, and in contact with the first substrate, 54. A booking-account system using a card according to claim 53, wherein the adhesive is a photo-curing adhesive or a light curing adhesive.

55. A booking-account system using a card according to claim 53, wherein the adhesive includes a powder comprising one of silver, nickel, aluminum, and aluminum nitride or a filler.

56. A booking-account system using a card according to claim 45, wherein the card has a thickness from 0.05 mm through 1.5 mm.

57. A booking-account system using a card according to claim 45, wherein the display device is a passive matrix type display device.

58. A booking-account system using a card according to claim 45, wherein the display device is an active matrix type display device.

59. A booking-account system using a card according to claim 45, wherein the display device is a liquid crystal display device.

60. A booking-account system using a card according to claim 45, wherein the display device is a light emitting deuce.

61. A booking-account system using a card according to claim 45, wherein the card is an IC card including an ATM card, train pass, or a prepaid card.

62. A booking-account system using a card according to claim 45, wherein the card is an ID card.

63. A booking-account system using a card according to claim 45, wherein the card is a semi-hard card.

64. A booking-account system using a card according to claim 45, wherein the display device is electrically connected to the first thin film integrated circuit and driving of the display device is controlled by the first thin film integrated circuit.

* * * * *